United States Patent
Terashita

(10) Patent No.: US 10,825,609 B2
(45) Date of Patent: Nov. 3, 2020

(54) MULTILAYER CERAMIC CAPACITOR AND MOUNTED STRUCTURE THEREOF

(71) Applicant: Murata Manufacturing Co., Ltd., Nagaokakyo-shi, Kyoto-fu (JP)

(72) Inventor: Yosuke Terashita, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 40 days.

(21) Appl. No.: 16/367,304

(22) Filed: Mar. 28, 2019

(65) Prior Publication Data

US 2019/0304683 A1 Oct. 3, 2019

(30) Foreign Application Priority Data

Mar. 30, 2018 (JP) .................................. 2018-066456

(51) Int. Cl.
*H01G 4/12* (2006.01)
*H01G 4/228* (2006.01)
*H01G 4/012* (2006.01)
*H01G 4/30* (2006.01)

(52) U.S. Cl.
CPC ............... *H01G 4/12* (2013.01); *H01G 4/012* (2013.01); *H01G 4/228* (2013.01); *H01G 4/30* (2013.01)

(58) Field of Classification Search
CPC .......... H01G 4/30; H01G 2/065; H01G 4/012; H01G 4/12; H01G 4/228; H01G 4/1227; H01G 4/33; H01G 4/248; H01G 4/0085; H01G 4/232; H02K 2201/10015
See application file for complete search history.

(56) References Cited

U.S. PATENT DOCUMENTS

| | | | |
|---|---|---|---|
| 5,507,896 A | 4/1996 | Yoshimura et al. | |
| 2010/0008017 A1* | 1/2010 | Ito | H01G 4/012 361/301.4 |
| 2018/0090277 A1* | 3/2018 | Kikuchi | H01G 4/33 |

FOREIGN PATENT DOCUMENTS

JP 02-161713 A 6/1990

* cited by examiner

*Primary Examiner* — Michael P McFadden
(74) *Attorney, Agent, or Firm* — Keating & Bennett, LLP

(57) ABSTRACT

A multilayer ceramic capacitor includes a laminated body, and an external electrode on both end surfaces of the laminated body. The external electrode includes a base electrode layer, a conductive resin layer on the base electrode layer, and a plating layer on the conductive resin layer. The amount of a curvature radius along a boundary portion between the base electrode layer and the conductive resin layer the boundary between the base electrode layer and the conductive resin layer at the ridge line of the laminated body is about 296.6 μm or more, the long side length in terms of flattened powder value is about 10.3 μm or more, the solid content concentration of PVC in the conductive resin layer is about 45 vol % or higher and about 60 vol % or lower, and the thickness of the conductive resin layer located at the ridge line is about 11.7 μm or more.

20 Claims, 5 Drawing Sheets

MULTILAYER CERAMIC CAPACITOR AND MOUNTED STRUCTURE THEREOF

CROSS REFERENCE TO RELATED APPLICATIONS

This application claims the benefit of priority to Japanese Patent Application No. 2018-066456 filed on Mar. 30, 2018. The entire contents of this application are hereby incorporated herein by reference.

BACKGROUND OF THE INVENTION

1. Field of the Invention

This invention relates to a multilayer ceramic capacitor, and a mounted structure thereof.

2. Description of the Related Art

In recent years, ceramic electronic components typified by multilayer ceramic capacitors have been used in harsher environments than ever before.

For example, multilayer ceramic capacitors for use in mobile devices, such as cellular phones and portable music players, are required to withstand impacts, such as dropping. Specifically, there is a need to keep the multilayer ceramic capacitors from falling off mounting boards and from being cracked, even if the capacitors are subjected to impacts such as dropping. In addition, multilayer ceramic capacitors for use in in-vehicle devices, such as ECUs, are required to withstand impacts, such as thermal cycling. Specifically, the multilayer ceramic capacitors cause laminated bodies to be cracked, if the flexural stress generated by the linear expansion and contraction of mounting boards in response to thermal cycling or the tensile stress applied to external electrodes exceeds the strength of the laminated bodies, and there is thus a need to keep the laminated bodies from being cracked even under the foregoing stress.

For the purpose of meeting the requirements as described above, a technique is proposed in which an external electrode of a multilayer ceramic electronic component includes a conductive resin layer that uses a conductive thermosetting resin containing a metal powder, for example, as in Japanese Patent Application Laid-Open No. H02-161713, thus even under a severe environment, relaxing stress from a mounting board, and then preventing a laminated body from being cracked.

Actually, as a design, when stress is applied to the multilayer ceramic capacitor as described in Japanese Patent Application Laid-Open No. H02-161713, a fracture crack will be generated typically in the conductive resin layer in the external electrode, at the interface between the conductive resin layer and a plating layer, or at the interface between the conductive resin layer and the laminated body, thus relieving the stress applied to the multilayer ceramic capacitor, and preventing the laminated body from being cracked.

However, in order to achieve the effect of preventing the laminated body from being cracked when stress is applied to the multilayer ceramic capacitor, a design with a margin may be adopted as an external electrode design, and even with weaker stress, such a design that generates a fracture crack may be adopted as described above.

However, in the case of such a design that generates a fracture crack with a weak force, the effect of preventing the laminated body from being cracked is able to be enhanced, but there is a decrease in fixing strength after mounting (the fixing strength with respect to the board due to the fixing strength between the external electrode and the laminated body), and there is thus a trade-off relationship. Therefore, for example, there is concern that the fracture may be accelerated with a drop impact or a repeated force due to vibration, thus causing a problem that the multilayer ceramic capacitor falls off the board.

SUMMARY OF THE INVENTION

Preferred embodiments of the present invention provide multilayer ceramic capacitors capable of maintaining a fixing strength between an external electrode and a laminated body, while maintaining the effect of preventing the laminated body from being cracked because of the effect of a conductive resin layer.

A multilayer ceramic capacitor according to a preferred embodiment of the present invention includes a laminated body including a plurality of dielectric layers laminated and a plurality of internal electrode layers laminated, and including a first principal surface and a second principal surface opposed to each other in a laminating direction, a first side surface and a second side surface opposed to each other in a width direction perpendicular or substantially perpendicular to the laminating direction, and a first end surface and a second end surface opposed to each other in a length direction perpendicular or substantially perpendicular to the laminating direction and the width direction; and a pair of external electrodes connected to the internal electrode layer, and disposed on the first end surface and the second end surfaces, partially on the first principal surface and second principal surface, and partially on the first side surface and the second side surface, where the external electrode includes a base electrode layer including a conductive metal and a glass component, a conductive resin layer including a thermosetting resin and a metal component, the conductive resin layer disposed on the base electrode layer, and a plating layer disposed on the conductive resin layer, a curvature radius along a boundary between the base electrode layer and the conductive resin layer is about 296.6 µm or more at a ridge line at which at least two surfaces of: the first principal surface or the second principal surface; and the first end surface or the second end surface intersect, the metal component of the conductive resin layer includes a spherical powder and flattened powder, has a flattened powder ratio of about 80% by weight or higher when the metal component is regarded as 100%, and has a long side length of about 10.3 µm or more in terms of D90 value of the flattened powder, the solid content concentration of PVC in the conductive resin layer is about 45 vol % or higher and about 60 vol % or lower, and the conductive resin layer located at the ridge line has a thickness of about 11.7 µm or more.

In addition, in a multilayer ceramic capacitor according to a preferred embodiment of the present invention, the long side length in terms of flattened powder D90 value is about 25.1 µm or less, and the conductive resin layer located at the ridge line has a thickness of about 25 µm or less.

A multilayer ceramic capacitor according to a preferred embodiment of the present invention includes a laminated body including a plurality of dielectric layers laminated and a plurality of internal electrode layers laminated, and including a first principal surface and a second principal surface opposed to each other in a laminating direction, a first side surface and a second side surface opposed to each other in a width direction perpendicular or substantially perpendicular to the laminating direction, and a first end surface and a second end surface opposed to each other in a length direction perpendicular or substantially perpendicular to the laminating direction and the width direction; and a pair of external electrodes connected to the internal electrode layer, and disposed on the first end surface and the second end surface, partially on the first principal surface and the second principal surface, and partially on the first side surface and the second side surface, where the external electrode includes a base electrode layer including a conductive metal and a glass component, a conductive resin layer including a thermosetting resin and a metal component, the conductive resin layer disposed on the base electrode layer, and a plating layer disposed on the conductive resin layer, and in mounting the multilayer ceramic capacitor on a substrate, a gap is provided between the conductive resin layer and the plating layer at a ridge line of the external electrode when stress from the substrate is applied to the multilayer ceramic capacitor.

In addition, in a multilayer ceramic capacitor according to a preferred embodiment of the present invention, the gap preferably is also present in a ridge line region adjacent to the ridge line of the external electrode.

A mounted structure of a multilayer ceramic capacitor according to a preferred embodiment of the present invention is a mounted structure of a multilayer ceramic capacitor in which the multilayer ceramic capacitor according to a preferred embodiment of the present invention is mounted on a substrate, wherein the substrate includes a signal electrode disposed on a principal surface of the substrate, and with the first principal surface or the second principal surface of, or the first side surface or the second side surface of the multilayer ceramic capacitor being opposed to the principal surface of the substrate, the external electrode of the multilayer ceramic capacitor is connected to the signal electrode of the substrate.

A mounted structure of a multilayer ceramic capacitor according to a preferred embodiment of the present invention is a mounted structure of a multilayer ceramic capacitor in which a multilayer ceramic capacitor according to a preferred embodiment of the present invention is mounted on a substrate, where the multilayer ceramic capacitor includes: a laminated body including a plurality of dielectric layers laminated and a plurality of internal electrode layers laminated, and including a first principal surface and a second principal surface opposed to each other in a laminating direction, a first side surface and a second side surface opposed to each other in a width direction perpendicular or substantially perpendicular to the laminating direction, and a first end surface and a second end surface opposed to each other in a length direction perpendicular or substantially perpendicular to the laminating direction and the width direction; and a pair of external electrodes connected to the internal electrode layer, and disposed on the first end surface and the second end surface, partially on the first principal surface and the second principal surface, and partially on the first side surface and the second side surface, the substrate includes a signal electrode disposed on a principal surface of the substrate, with the first principal surface or the second principal surface of the multilayer ceramic capacitor, or the first side surface or the second side surface of the multilayer ceramic capacitor being opposed to the principal surface of the substrate, the external electrode of the multilayer ceramic capacitor is connected to the signal electrode of the substrate, the external electrode includes a base electrode layer including a conductive metal and a glass component, a conductive resin layer including a thermosetting resin and a metal component, the conductive resin layer disposed on the base electrode layer, and a plating layer disposed on the conductive resin layer, and a gap is provided between the conductive resin layer and the plating layer at a ridge line of the external electrode.

In addition, in a mounted structure of a multilayer ceramic capacitor according to a preferred embodiment of the present invention, the gap preferably remains in a ridge line region of the external electrode.

According to preferred embodiments of the present invention, multilayer ceramic capacitors are provided which are each capable of maintaining the fixing strength between an external electrode and a laminated body, while maintaining the effect of preventing the laminated body from being cracked because of the effect of a conductive resin layer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic capacitor according to preferred embodiments of the present invention will be described.

Figure 1:
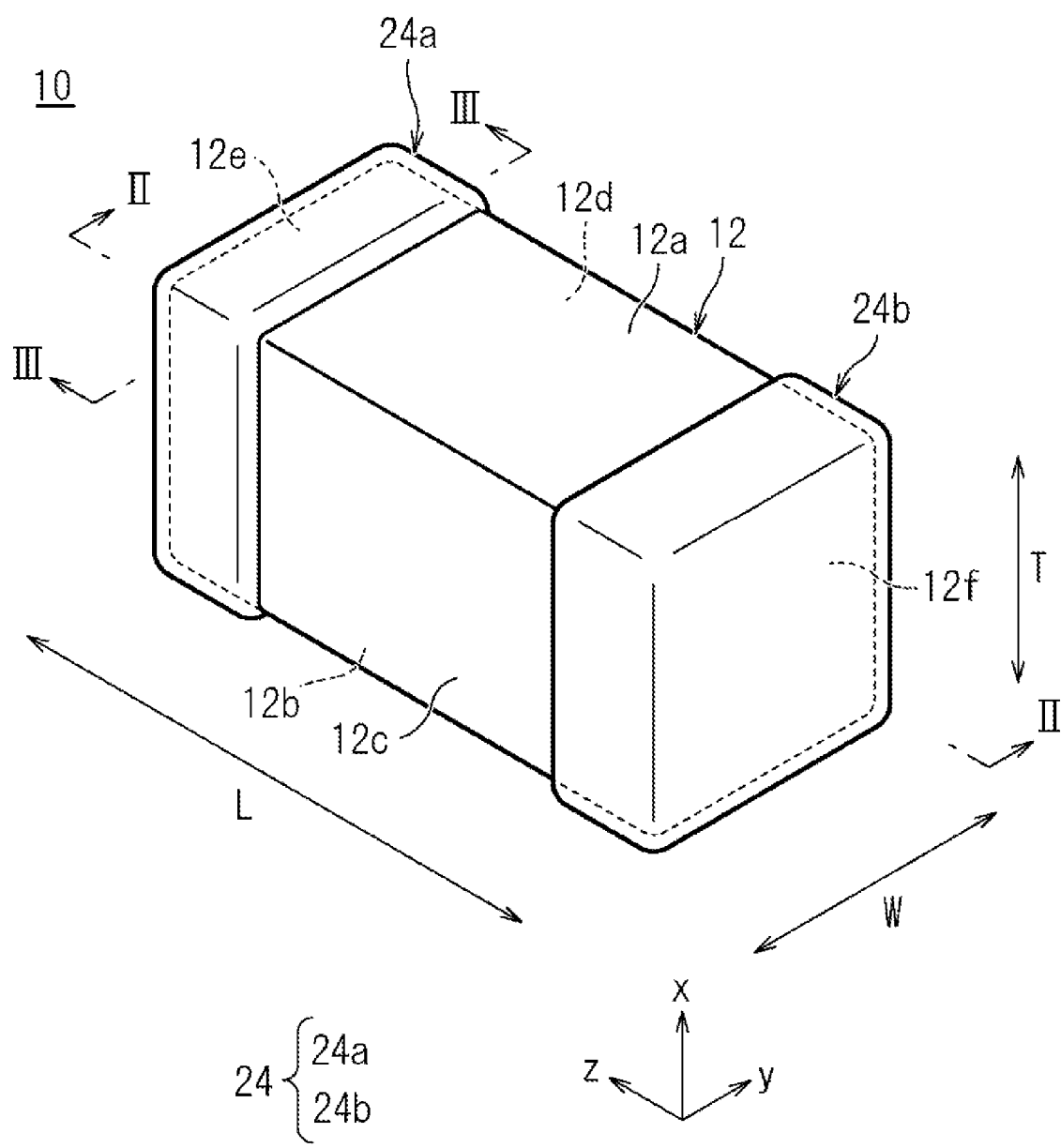
FIG. 1 is an appearance perspective view illustrating an example of a multilayer ceramic capacitor according to a preferred embodiment of the present invention.
Figure 2:
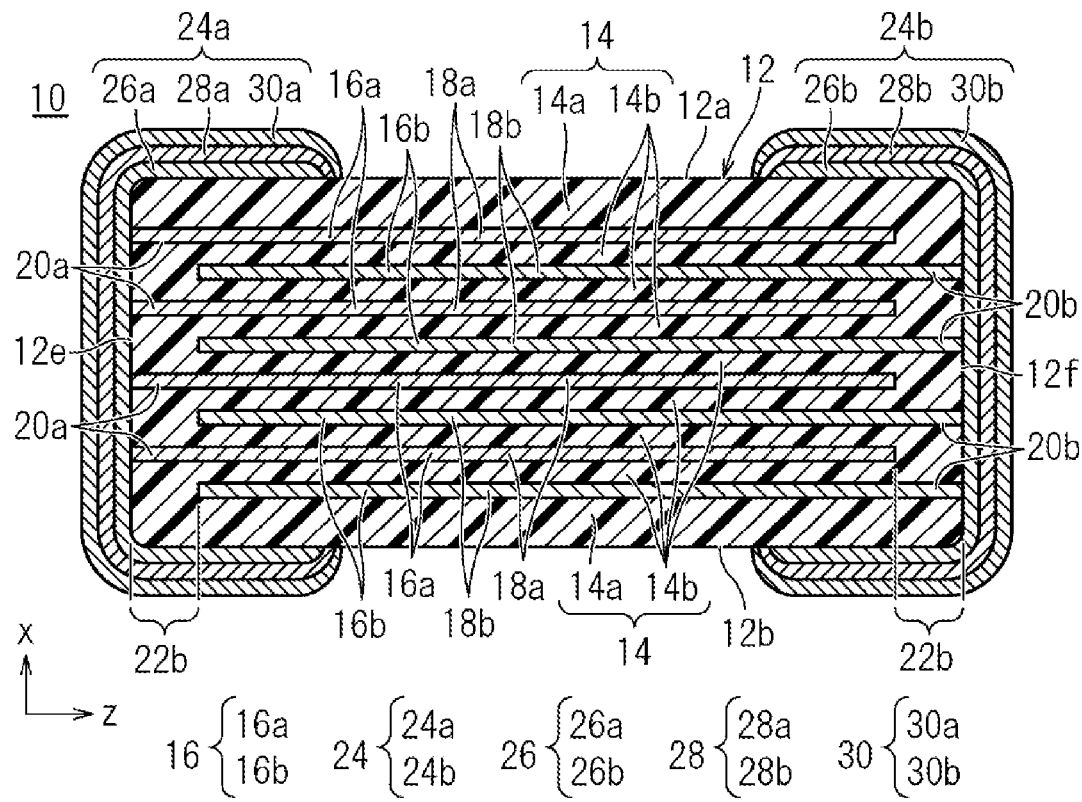
FIG. 2 is a cross-sectional view taken along the line II-II in FIG. 1 that illustrates a multilayer ceramic capacitor according to a preferred embodiment of the present invention.
Figure 3:
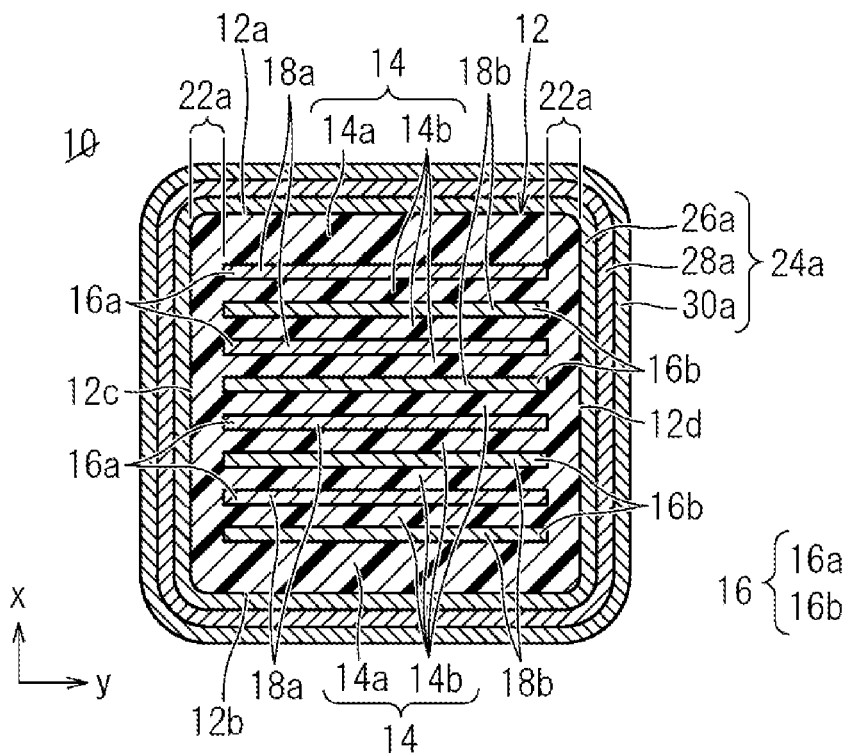
FIG. 3 is a cross-sectional view taken along the line III-III in FIG. 1 that illustrates a multilayer ceramic capacitor according to a preferred embodiment of the present invention.

FIG. 1 is an appearance perspective view illustrating a preferred embodiment of a multilayer ceramic capacitor according to the present invention. FIG. 2 is a cross-sectional view taken along the line II-II in FIG. 1 that illustrates the multilayer ceramic capacitor the present preferred embodiment. FIG. 3 is a cross-sectional view taken along the line III-III in FIG. 1 that illustrates the multilayer ceramic capacitor according to the present preferred embodiment.

As shown in FIGS. 1 to 3, the multilayer ceramic capacitor 10 preferably includes a cuboid laminated body 12.

The laminated body 12 includes a plurality of dielectric layers 14 and a plurality of internal electrode layers 16 that are laminated. Furthermore, the laminated body 12 includes a first principal surface 12a and a second principal surface 12b opposed to each other in the laminating direction x, a first side surface 12c and a second side surface 12d opposed to each other in the width direction y perpendicular or substantially perpendicular to the laminating direction x, and a first end surface 12e and a second end surface 12f opposed to each other in the length direction z perpendicular or substantially perpendicular to the laminating direction x and the width direction y. The laminated body 12 preferably includes corners and ridge lines that are rounded. It is to be noted that the corner refers to the intersection of three adjacent surfaces of the laminated body, and the ridge line refers to the intersection of two adjacent surfaces of the laminated body. In addition, the first principal surface 12a and the second principal surface 12b, the first side surface 12c and the second side surface 12d, and the first end surface 12e and the second end surface 12f may partially or entirely include irregularities. Furthermore, the dimension of the laminated body 12 in the length direction z is not necessarily longer than the dimension thereof in the width direction y.

The number of the dielectric layers 14 laminated is not particularly limited, but is preferably 15 or more and 200 or less, for example.

The laminated body 12 includes an outer layer portion 14a including a plurality of dielectric layers 14, and an inner layer portion 14b including one or more dielectric layers 14 and a plurality of internal electrode layers 16 disposed thereon. The outer layer portion 14a is located close to the first principal surface 12a and second principal surface 12b of the laminated body 12, and is an aggregate of a plurality of dielectric layers 14 located between the first principal surface 12a and the internal electrode layer 16 closest to the first principal surface 12a, and a plurality of dielectric layers 14 located between the second principal surface 12b and the internal electrode layer 16 closest to the second principal surface 12b. Further, the region sandwiched between both of the outer layer portions 14a is the inner layer portion 14b. The outer layer portion 14a is preferably about 150 μm or more and about 300 μm or less in thickness.

While the dimensions of the laminated body 12 are not particularly limited, the dimension in the length direction z is preferably about 3.05 mm or more and about 5.4 mm or less, the dimension in the width direction y is preferably about 1.57 mm or more and about 4.92 mm or less, and the dimension in the laminating direction x is preferably about 1.57 mm or more and about 2.96 mm or less.

The dielectric layers 14 may preferably be made of, for example, a dielectric material. As such a dielectric material, a dielectric ceramic may be used which preferably includes, for example, $BaTiO_3$, $CaTiO_3$, $SrTiO_3$, or $CaZrO_3$. In the case of including the dielectric material as a main component, the dielectric material obtained with the addition of a component that is lower in content than the main component, for example, a Mn compound, a Fe compound, a Cr compound, a Co compound, a Ni compound, may preferably be used, depending on characteristics of the laminated body 12 desired.

The dielectric layer 14 after firing is preferably about 0.5 μm or more and about 20.0 μm or less in thickness, for example.

The laminated body 12 includes, as the plurality of internal electrode layers 16, for example, a plurality of first internal electrode layers 16a and a plurality of second internal electrode layers 16b which are preferably rectangular or substantially rectangular in shape. The plurality of first internal electrode layers 16a and the plurality of second internal electrode layers 16b are buried so as to be alternately disposed at regular intervals in the laminating direction x of the laminated body 12.

The first internal electrode layer 16a preferably includes a first opposed electrode portion 18a opposed to the second internal electrode layer 16b, and a first extended electrode portion 20a located close to one end of the first internal electrode layer 16a from the first opposed electrode portion 18a to the first end surface 12e of the laminated body 12. The first extended electrode portion 20a includes an end extended to the first end surface 12e and exposed.

The second internal electrode layer 16b includes a second opposed electrode portion 18b opposed to the first internal electrode layer 16a, and a second extended electrode portion 20b located close to one end of the second internal electrode layer 16b from the second opposed electrode portion 18b to the second end surface 12f of the laminated body 12. The second extended electrode portion 20b includes an end extended to the second end surface 12f and exposed.

The shape of the first opposed electrode portion 18a of the first internal electrode layer 16a and the shape of the second opposed electrode portion 18b of the second internal electrode layer 16b are not particularly limited, but are preferably rectangular or substantially rectangular, for example. However, the corner may be rounded, or the corner may be oblique (tapered).

The shape of the first extended electrode portion 20a of the first internal electrode layer 16a and the shape of the second extended electrode portion 20b of the second internal electrode layer 16b are not particularly limited, but are preferably rectangular or substantially rectangular, for example. However, the corner may be rounded, or the corner may be oblique (tapered).

The width of the first opposed electrode portion 18a of the first internal electrode layer 16a and the width of the first extended electrode portion 20a of the first internal electrode layer 16a may be the same or substantially the same width, or either one of the widths may be narrower. Similarly, the width of the second opposed electrode portion 18b of the second internal electrode layer 16b and the width of the second extended electrode portion 20b of the second internal electrode layer 16b may be the same or substantially the same width, or either one of the widths may be narrower.

The laminated body 12 includes side portions (W gaps) 22a of the laminated body 12, which are provided between ends of the first opposed electrode portion 18a and second opposed electrode portion 18b in the width direction y and the first side surface 12c, and between the other ends of the first opposed electrode portion 18a and second opposed electrode portion 18b in the width direction y and the second side surface 12d. Furthermore, the laminated body 12 preferably includes ends (L gaps) 22b of the laminated body 12, which are between an end of the first internal electrode layer 16a on the side opposite to the first extended electrode portion 20a and the second end surface 12f, and between an end of the second internal electrode layer 16b on the side opposite to the second extended electrode portion 20b and the first end surface 12e.

The internal electrode layer 16 preferably contains a metal such as Ni, Cu, Ag, Pd, and Au, or an appropriate conductive material containing one of the metals, for example, an alloy containing at least one of the metals, such as an Ag—Pd alloy. Ethyl cellulose or an acrylic resin, for example, is preferably used as a resin component in a conductive paste for internal electrodes for the internal electrode layers 16.

The internal electrode layer 16 is preferably about 0.2 μm or more and about 2.0 μm or less in thickness, for example. In addition, the number of the internal electrode layers 16 is preferably about 15 or more and about 200 or less, for example.

External electrodes 24 are disposed on the first end surface 12e and second end surface 12f of the laminated body 12. The external electrodes 24 include a first external electrode 24a and a second external electrode 24b.

The first external electrode 24a is disposed on the surface of the first end surface 12e of the laminated body 12, and extends from the first end surface 12e and partially cover each of the first principal surface 12a, the second principal surface 12b, the first side surface 12c, and the second side surface 12d. In this case, the first external electrode 24a is electrically connected to the first extended electrode portion 20a of the first internal electrode layer 16a. The first external electrode 24a may be provided only on the first end surface 12e of the laminated body 12.

The second external electrode 24b is disposed on the surface of the second end surface 12f of the laminated body 12, and extends from the second end surface 12f and partially cover each of the first principal surface 12a, the second principal surface 12b, the first side surface 12c, and the second side surface 12d. In this case, the second external electrode 24b is electrically connected to the second extended electrode portion 20b of the second internal electrode layer 16b. The second external electrode 24b may be provided only on the second end surface 12f of the laminated body 12.

In the laminated body 12, the first opposed electrode portion 18a of the first internal electrode layer 16a and the second opposed electrode portion 18b of the second internal electrode layer 16b are opposed to each other with the dielectric layer 14 interposed therebetween, thus providing electrostatic capacitance. Therefore, electrostatic capacitance is able to be obtained between the first external electrode 24a connected to the first internal electrode layers 16a and the second external electrode 24b connected to the second internal electrode layers 16b, and characteristics are developed as a capacitor.

Figure 4A:
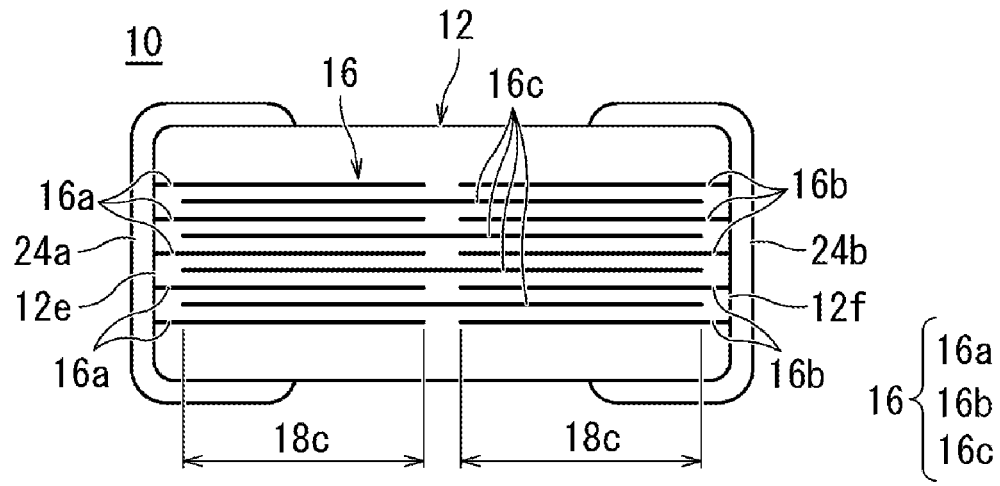
FIG. 4A is a cross-sectional view taken along the line II-II in FIG. 1, illustrating a structure in which an opposed electrode portion of an internal electrode layer of a multilayer ceramic capacitor according to a preferred embodiment of the present invention is divided into two portions.
Figure 4B:
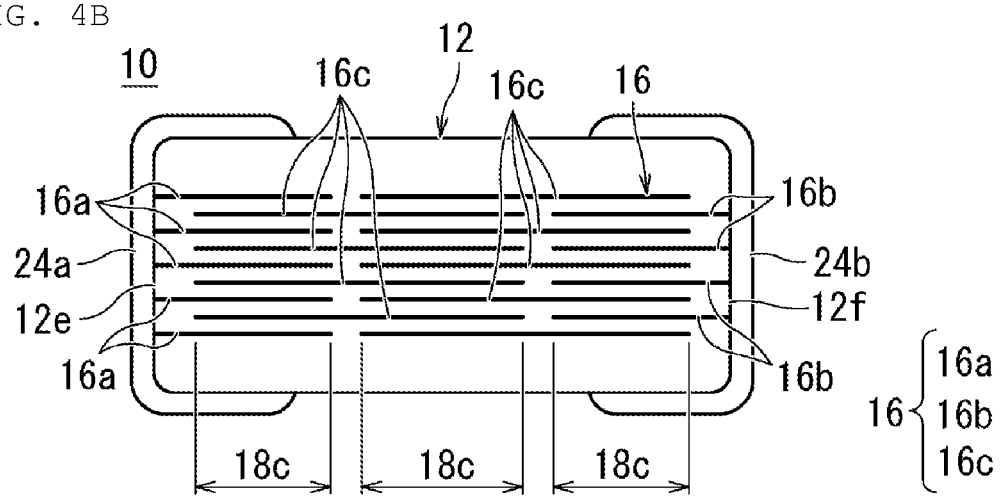
FIG. 4B is a cross-sectional view taken along the line II-II in FIG. 1, illustrating a structure in which an opposed electrode portion of an internal electrode layer of a multilayer ceramic capacitor according to a preferred embodiment of the present invention is divided into three parts.
Figure 4C:
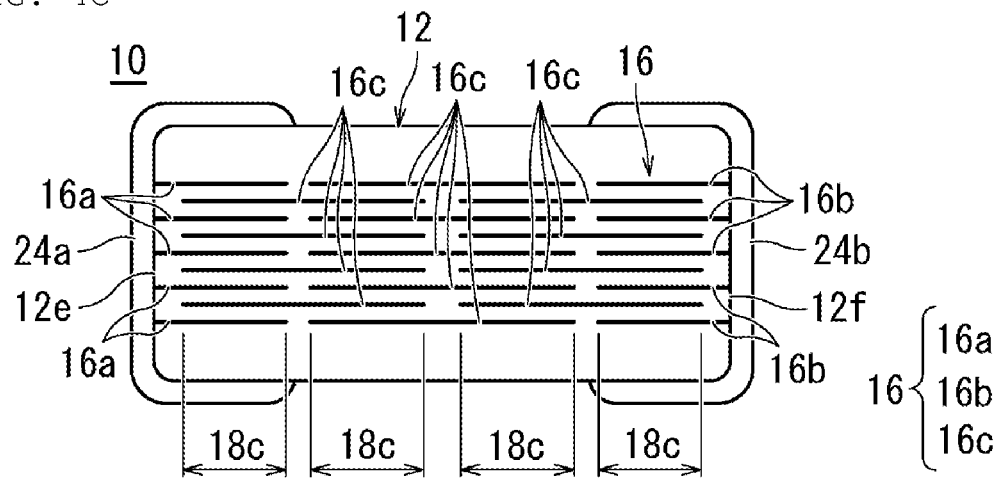
FIG. 4C is a cross-sectional view taken along the line II-II in FIG. 1, illustrating a structure in which an opposed electrode portion of an internal electrode layer of a multilayer ceramic capacitor according to a preferred embodiment of the present invention is divided into four portions.

Further, as shown in FIGS. 4A to 4C, a structure may be provided in which floating internal electrode layers 16c that are not extended to either the first end surface 12e or the second end surface 12f are provided as internal electrode layers 16 in addition to the first internal electrode layers 16a and the second internal electrode layers 16b, and opposed electrode portions 18c are divided by the floating internal electrode layers 16c into multiple portions. For example, the structure is a double structure as shown in FIG. 4A, a triple structure as shown in FIG. 4B, and a quadruple structure as shown in FIG. 4C, and quadruple or more structures may be provided. As described, providing a structure in which the opposed electrode portions 18c are divided into multiple portions defines multiple capacitor components among the internal electrode layers 16a, 16b, and 16c opposed to each other, thus providing a structure in which the capacitor components are connected in series. Therefore, the voltage applied to each of the capacitor components is decreased, thus making it possible to increase the withstanding voltage of the multilayer ceramic capacitor.

The first external electrode 24a and the second external electrode 24b each include a base electrode layer 26 preferably containing a conductive metal and a glass component, a conductive resin layer 28 containing a thermosetting resin and a metal component, covering the base electrode layer 26, and a plating layer 30 disposed so as to cover the conductive resin layer 28, for example.

The base electrode layer 26 includes a first base electrode layer 26a and a second base electrode layer 26b.

The first base electrode layer 26a is disposed on the surface of the first end surface 12e of the laminated body 12, and extends from the first end surface 12e and partially cover each of the first principal surface 12a, the second principal surface 12b, the first side surface 12c, and the second side surface 12d.

The second base electrode layer 26b is disposed on the surface of the second end surface 12f of the laminated body 12, and extends from the second end surface 12f and partially cover each of the first principal surface 12a, the second principal surface 12b, the first side surface 12c, and the second side surface 12d.

The first base electrode layer 26a may be disposed only on the surface of the first end surface 12e of the laminated body 12, and the second base electrode layer 26b may be disposed only on the surface of the second end surface 12f of the laminated body 12.

Each of the thicknesses of the first base electrode layer 26a located on the first end surface 12e and the second base electrode layer 26b located on the second end surface 12f in the central portion in the height direction is preferably about 30 μm or more and about 200 μm or less, for example.

In addition, in a case in which the base electrode layers are provided on the first principal surface 12a and the second principal surface 12b as well as the surfaces of the first side surface 12c and second side surface 12d, each of the thicknesses of the first base electrode layer 26a and second base electrode layer 26b located on the first principal surface 12a and the second principal surface 12b as well as the surfaces of the first side surface 12c and second side surface 12d in the central portion in the length direction z is preferably approximately 15 μm or more and approximately 30 μm or less, for example.

The base electrode layer 26 preferably contains a conductive metal and a glass component, for example. The layer preferably contains, as the conductive metal of the base electrode layer 26, at least one selected from Cu, Ni, Ag, Pd, an Ag—Pd alloy, Au, and other suitable metals, for example. In addition, the layer preferably contains, as the glass of the base electrode layer 26, at least one selected from B, Si, Ba, Mg, Al, Li, and other suitable materials, for example. The base electrode layer 26 may include multiple layers. The base electrode layer 26 is preferably obtained by applying a conductive paste containing glass and a metal to the laminated body 12 and baking the paste, and may be fired at the same time as the dielectric layers 14 and the internal electrode layers 16, or may be baked after firing the dielectric layers 14 and the internal electrode layers 16. A dielectric material may be used in place of the glass, and in the case of using a dielectric material in place of the glass, it is preferable to fire the base electrode layer 26 at the same time as the dielectric layers 14 and the internal electrode layers 16.

The conductive resin layer 28 includes a first conductive resin layer 28a and a second conductive resin layer 28b.

The first conductive resin layer 28a covers the first base electrode layer 26a. Specifically, the first conductive resin layer 28a is disposed over the first end surface 12e on the surface of the first base electrode layer 26a, and preferably reaches the first principal surface 12a, the second principal surface 12b, the first side surface 12c, and the second side surface 12d on the surface of the first base electrode layer 26a. The first conductive resin layer 28a may be disposed on only the surface of the first base electrode layer 26a disposed on the first end surface 12e, or may cover the surface of the first base electrode layer 26a disposed on the first end surface 12e, and partially cover the surface of the first base electrode layer 26a disposed on the first principal surface 12a, the second principal surface 12b, the first side surface 12c, and the second side surface 12d.

The second conductive resin layer 28b covers the second base electrode layer 26b. Specifically, the second conductive resin layer 28b is disposed over the second end surface 12f on the surface of the second base electrode layer 26b, and preferably reaches the first principal surface 12a, the second principal surface 12b, the first side surface 12c, and the second side surface 12d on the surface of the second base electrode layer 26b. The second conductive resin layer 28b may be disposed on only the surface of the second base electrode layer 26b disposed on the first end surface 12f, or may cover the surface of the second base electrode layer 26b disposed on the second end surface 12f, and partially cover the surface of the second base electrode layer 26b disposed on the first principal surface 12a, the second principal surface 12b, the first side surface 12c, and the second side surface 12d.

The conductive resin layers 28 are preferably approximately 50 μm or more and approximately 150 μm or less in thickness, for example, in the respective central portions of the first base electrode layer 26a located on the first end surface 12e and the second base electrode layer 26b located on the second end surface 12f in the height direction.

In addition, in a case in which the base electrode layers are provided on the first principal surface 12a and the second principal surface 12b and the surfaces of the first side surface 12c and second side surface 12d, the conductive resin layers 28 are preferably approximately 15 μm or more and approximately 60 μm or less in thickness, for example, in the respective central portions of the first base electrode layer 26a and second base electrode layer 26b located on the first principal surface 12a and the second principal surface 12b and the surfaces of the first side surface 12c and second side surface 12d in the length direction.

The conductive resin layer 28 preferably contains a thermosetting resin and a metal, for example.

The conductive resin layer 28 is, because of containing a thermosetting resin, more flexible than a conductive layer made of a plating film or a fired product of a conductive paste, for example. For this reason, even when a physical impact or an impact due to a thermal cycle is applied to the multilayer ceramic capacitor 10, the conductive resin layers 28 define and function as buffer layers, thus making it possible to prevent the multilayer ceramic capacitor 10 from being cracked.

As a metal included in the conductive resin layer, Ag, Cu, or an alloy thereof, for example, may preferably be used. In addition, a metal powder that includes a surface coated with Ag, for example, may preferably be used. In the case of using a metal powder that includes a surface coated with Ag, it is preferable to use Cu or Ni as the metal powder, for example. In addition, Cu subjected to an antioxidant treatment may be also used.

In addition, the metal included in the conductive resin layer 28 may contain multiple kinds of metals, and may be made of, for example, a first metal component and a second metal component.

The first metal component is preferably made of, for example, Sn, In, or Bi, or an alloy containing at least one of these metals. The first metal component is more preferably made of Sn or an alloy containing Sn. Specific examples of the alloy containing Sn include Sn—Ag, Sn—Bi, and Sn—Ag—Cu.

The second metal component is preferably made of, for example, a metal such as Cu, Ag, Pd, Pt, and Au, or an alloy containing at least one of these metals. The second metal component is more preferably Cu or Ag.

The use of an Ag conductive metal powder as the metal included in the conductive resin layer 28 is preferred, because Ag has the lowest specific resistance among metals, and is thus suitable for electrode materials, and because Ag is a noble metal, and thus has high weather resistance without being oxidized. The use of a metal coated with Ag as the metal included in the conductive resin layer is preferred, because it makes the parent metal inexpensive while maintaining the properties of Ag.

The metal included in the conductive resin layer 28 is mainly responsible for the conductivity of the conductive resin layer 28. Specifically, conductive fillers are brought into contact with each other, thus defining a conductive path within the conductive resin layer 28.

As the resin of the conductive resin layer 28, various known thermosetting resins may be used, such as an epoxy resin, a phenol resin, an urethane resin, a silicone resin, and a polyimide resin, for example. An epoxy resin which is excellent in heat resistance, moisture resistance, and adhesion, for example, is a particularly suitable resin.

In addition, the conductive resin layer 28 preferably includes therein a curing agent together with the thermosetting resin. In the case of using an epoxy resin as a base resin, various known compounds such as phenolic, amine-, acid anhydride-, imidazole-type compounds, for example, may be used as a curing agent for the epoxy resin.

A thickness of the conductive resin layer 28 at the boundary between the base electrode layer 26 and the conductive resin layer 28 is preferably about 296.6 μm or more at the ridge line where the two surfaces of: the first principal surface 12a or the second principal surface 12b of the laminated body 12; and the first end surface 12e or the second end surface 12f thereof intersect.

Further, the thickness of the conductive resin layer 28 at the boundary between the base electrode layer 26 and the conductive resin layer 28 may preferably be also about 296.6 μm or more at the ridge line where the two surfaces of: the first side surface 12c or the second side surface 12d of the laminated body 12; and the first end surface 12e or the second end surface 12f thereof intersect.

The metal component of the conductive resin layer 28 preferably includes a flattened powder. Thus, according to the present preferred embodiment, a force in the normal direction at the ridge line of the laminated body 12 from flexural stress makes it possible to peel off the plating layer 30 from the conductive resin layer 28 at the ridge line. In addition to the flattened powder, a spherical shape or other suitable shape may be mixed.

The definition of the flattened powder is that when the size of the powder is decomposed into three dimensions of X, Y, and Z, the dimensions of X and Y meet X>5Z and T>5Z with respect to the smallest Z.

In addition, the metal component of the conductive resin layer 28 preferably has a flattened powder ratio of, for example, about 80% by weight or higher when the metal component is regarded as 100%. The flattened powder included as the metal component of the conductive resin layer 28 preferably has, for example, a long side length of about 10.3 µm or more in terms D90 value of the flattened powder. On the other hand, the long side length in D90 value of the flattened powder is preferably about 25.1 µm or less. There is no change in flattened powder D90 value either in the case of a paste form or after firing.

The solid content concentration of PVC (pigment volume concentration) in the conductive resin layer 28 is preferably about 45 vol % or higher and about 60 vol % or lower, for example. The PVC of higher than about 60 vol % makes it difficult to make paste due to the lack of an organic component for the filler.

It is to be noted that the PVC (PVC: Pigment Volume Concentration) refers to a pigment volume concentration which is the volume ratio of a pigment in the solid component in an ink. Specifically, the ink (paste) includes therein a pigment (metal powder or glass in the case of a paste), a binder, and a solvent. The volume ratio of pigment/(pigment+binder) is referred to as a PVC in the case of considering the removal of the solvent therefrom (dry film). In other words, the PVC represents the proportion of the inorganic component in the dry film in terms of volume.

The total thickness of the conductive resin layer 28 located at the ridge line where the two surfaces of: the first principal surface 12a or the second principal surface 12b of the laminated body 12; and the first end surface 12e or the second end surface 12f thereof intersect is preferably about 11.7 µm or more, for example. On the other hand, the total thickness of the conductive resin layer 28 located at the ridge line where the two surfaces of: the first principal surface 12a or the second principal surface 12b of the laminated body 12; and the first end surface 12e or the second end surface 12f thereof intersect is preferably about 25 µm or less, for example.

It is to be noted that the thickness of the conductive resin layer 28 located at the ridge line at which the two surfaces of: the first side surface 12c or the second side surface 12d of the laminated body 12; and the first end surface 12e or the second end surface 12f thereof intersect may also preferably be about 11.7 µm or more and 25 µm or less, for example.

The plating layer 30 includes a first plating layer 30a and a second plating layer 30b.

The first plating layer 30a covers the first conductive resin layer 28a. Specifically, the first plating layer 30a is disposed over the first end surface 12e on the surface of the first conductive resin layer 28a, and preferably reaches the first principal surface 12a, the second principal surface 12b, the first side surface 12c, and the second side surface 12d on the surface of the first conductive resin layer 28a. The first plating layer 30a may be disposed on only the surface of the first base electrode layer 26a disposed on the first end surface 12e.

The second plating layer 30b covers the second conductive resin layer 28b. Specifically, the second plating layer 30b is disposed over the second end surface 12f on the surface of the second conductive resin layer 28b, and preferably reaches the first principal surface 12a, the second principal surface 12b, the first side surface 12c, and the second side surface 12d on the surface of the second conductive resin layer 28b. The second plating layer 30b may be disposed on only the surface of the second base electrode layer 26b disposed on the second end surface 12f.

The thicknesses of the first plating layer 30a located on the first end surface 12e and the second plating layer 30b located on the second end surface 12f in the central portion in the height direction are preferably, for example, about 1 µm or more and about 15 µm or less.

In addition, the thicknesses of the first plating layer 30a and second plating layer 30b located on the first principal surface 12a and the second principal surface 12b and the surfaces of the first side surface 12c and second side surface 12d are preferably about 1 µm or more and about 15 µm or less, for example, in the central portion of in the direction z.

The plating layer 30 preferably contains at least one selected from, for example, Cu, Ni, Sn, Ag, Pd, an Ag—Pd alloy, Au, and other suitable material, for example.

The plating layer 30 may include multiple layers. However, the plating layer 30 preferably has a two-layer structure including a Ni plating layer and a Sn plating layer. The Ni plating layer is provided so as to cover the surface of the conductive resin layer 28, thus providing solder barrier performance. In addition, providing the Sn plating layer on the surface of the Ni plating layer makes it possible to improve the wettability of a solder for use in mounting the multilayer ceramic capacitor 10, and then allow for easy mounting.

The dimension of the multilayer ceramic capacitor 10 including the laminated body 12, the first external electrode 24a, and the second external electrode 24b in the length direction z is referred to as an L dimension, the dimension of the multilayer ceramic capacitor 10 including the laminated body 12, the first external electrode 24a, and the second external electrode 24b in the laminating direction x is referred to as a T dimension, and the dimension of the multilayer ceramic capacitor 10 including the laminated body 12, the first external electrode 24a, and the second external electrode 24b in the width direction y is referred to as a W dimension.

As for the dimensions of the multilayer ceramic capacitor 10, preferably, the L dimension in the length direction z is about 3.1 mm or more and about 5.6 mm or less, the W dimension in the width direction y is about 1.6 mm or more and about 5.1 mm or less, and the T dimension in the laminating direction x is about 1.6 mm or more and about 3.2 mm or less, for example.

In the multilayer ceramic capacitor 10 shown in FIG. 1, the thickness of the conductive resin layer 28 at the boundary between the base electrode layer 26 and the conductive resin layer 28 is preferably about 296.6 µm or more at the ridge line where the two surfaces of: the first principal surface 12a or the second principal surface 12b of the laminated body 12; and the first end surface 12e or the second end surface 12f thereof intersect. Thus, when flexural stress of a mounting board is applied to the multilayer ceramic capacitor 10, the location where the external electrode 24 has a fracture crack generated can be limited. Specifically, setting the thickness of the conductive resin layer 28 at the boundary between the base electrode layer 26 and the conductive resin layer 28 at the ridge line of the laminated body 12 to about 296.6 µm or more, and controlling the flexural stress, which is mechanical stress, such that the stress is applied in the normal direction to the thickness of the at the ridge line of the laminated body 12 makes it possible to generate a fracture crack at the interface between the plating layer 30 and the conductive resin layer 28 at the ridge line of the multilayer ceramic capacitor 10.

Therefore, when the flexural stress of a mounting board is applied to the multilayer ceramic capacitor 10, the fixing strength between the external electrode 24 and the laminated body 12 can be maintained without generating any fracture crack at the portion other than the ridge line, while relaxing the stress by generating a fracture crack at the ridge line of the external electrode 24 to relieve the stress. As a result, even in the case of mounting the multilayer ceramic capacitor on a mounting board, the fixing strength with respect to the mounting board can be maintained, thus preventing the problem of causing the multilayer ceramic capacitor 10 to fall off the mounting board with repeated forces due to a drop impact or vibration.

In the multilayer ceramic capacitor 10 shown in FIG. 1, the ridge line where the two surfaces of: the first side surface 12c or the second side surface 12d of the laminated body 12; and the first end surface 12e or the second end surface 12f thereof intersect may be formed, such that the thickness of the conductive resin layer 28 at the boundary between the base electrode layer 26 and the conductive resin layer 28 is preferably about 296.6 µm or more, for example.

Thus, selecting the direction with respect to the mounting surface is eliminated, and the advantageous effect described above is able to be achieved not only in the case in which the first principal surface 12a and the second principal surface 12b of the laminated body 12 are parallel to the mounting surface, but also in the case in which the capacitor is mounted such that the first side surface 12c and the second side surface 12d are parallel to the mounting surface.

In addition, in the multilayer ceramic capacitor 10 shown in FIG. 1, as for the metal component of the conductive resin layer 28, the flattened powder ratio is preferably about 80% by weight or higher, for example, when the metal component is regarded as 100%, and thus, in the conductive resin layer 28 at the ridge line of the laminated body 12, the flattened powder structured to be sufficiently stacked is able to decrease the interfacial strength between the conductive resin layer 28 and the plating layer 30.

In addition, in the multilayer ceramic capacitor 10 shown in FIG. 1, the flattened powder included as the metal component of the conductive resin layer 28 preferably has a long side length of about 10.3 µm or more, for example, in terms of flattened powder D90 value, thus making it possible to orient the flattened powder at the ridge line of the laminated body 12 in accordance with the R of the ridge line, and then making it possible to achieve stable peeling at the time of applying the flexural stress.

On the other hand, in the multilayer ceramic capacitor 10 shown in FIG. 1, when the long side length in flattened powder D90 value is about 25.1 µm or less, the orientation of the flattened powder at the ridge line of the laminated body 12 is improved, thus making it possible to peel the ridge line off reliably.

As described, when flexural stress caused by the substrate is applied to the multilayer ceramic capacitor, the location at which the external electrode 24 has a fracture crack generated is able to be limited.

Furthermore, in the multilayer ceramic capacitor 10 shown in FIG. 1, the solid content concentration of PVC (pigment volume concentration) in the conductive resin layer 28 is preferably about 45 vol % or higher and about 60 vol % or lower, for example, thus making it possible to orient the flattened powder at the ridge line of the laminated body 12 in accordance with the R of the ridge line, and then making it possible to achieve stable peeling at the time of applying the flexural stress.

In the multilayer ceramic capacitor 10 shown in FIG. 1, the conductive resin layer 28 located at the ridge line at which the two surfaces of: the first principal surface 12a or the second principal surface 12b of the laminated body 12; and the first end surface 12e or the second end surface 12f thereof intersect is preferably about 11.7 µm or more in thickness, for example, thus making it possible to stack and orient the flattened powder at the ridge line of the laminated body 12, and accordingly, when flexural stress is generated, a peeled portion is able to be provided at this site in a stable manner.

On the other hand, in the multilayer ceramic capacitor 10 shown in FIG. 1, the thickness of the conductive resin layer 28 located at the ridge line at which the two surfaces of: the first principal surface 12a or the second principal surface 12b of the laminated body 12; and the first end surface 12e or the second end surface 12f thereof intersect is preferably about 25 µm or less, for example. In a case in which the thickness of the conductive resin layer 28 located at the ridge line at which the two surfaces of: the first principal surface 12a or the second principal surface 12b of the laminated body 12; and the first end surface 12e or the second end surface 12f thereof intersect is preferably larger than about 25 µm, for example, the film thickness of the entire external electrode 24 is excessively increased, which makes it difficult to achieve a design within standard dimensions.

In the multilayer ceramic capacitor 10 shown in FIG. 1, the thickness of the conductive resin layer 28 located at the ridge line where the two surfaces of: the first side surface 12c or the second side surface 12d of the laminated body 12; and the first end surface 12e or the second end surface 12f thereof intersect may be also preferably about 11.7 µm or more and about 25 µm or less, for example.

Thus, selecting the direction with respect to the mounting surface is eliminated, and the advantageous effect mentioned above is able to be achieved not only in the case in which the first principal surface 12a and the second principal surface 12b of the laminated body 12 are parallel or substantially parallel to the mounting surface, but also in the case in which the capacitor is mounted such that the first side surface 12c and the second side surface 12d are parallel or substantially parallel to the mounting surface.

Figure 5A:
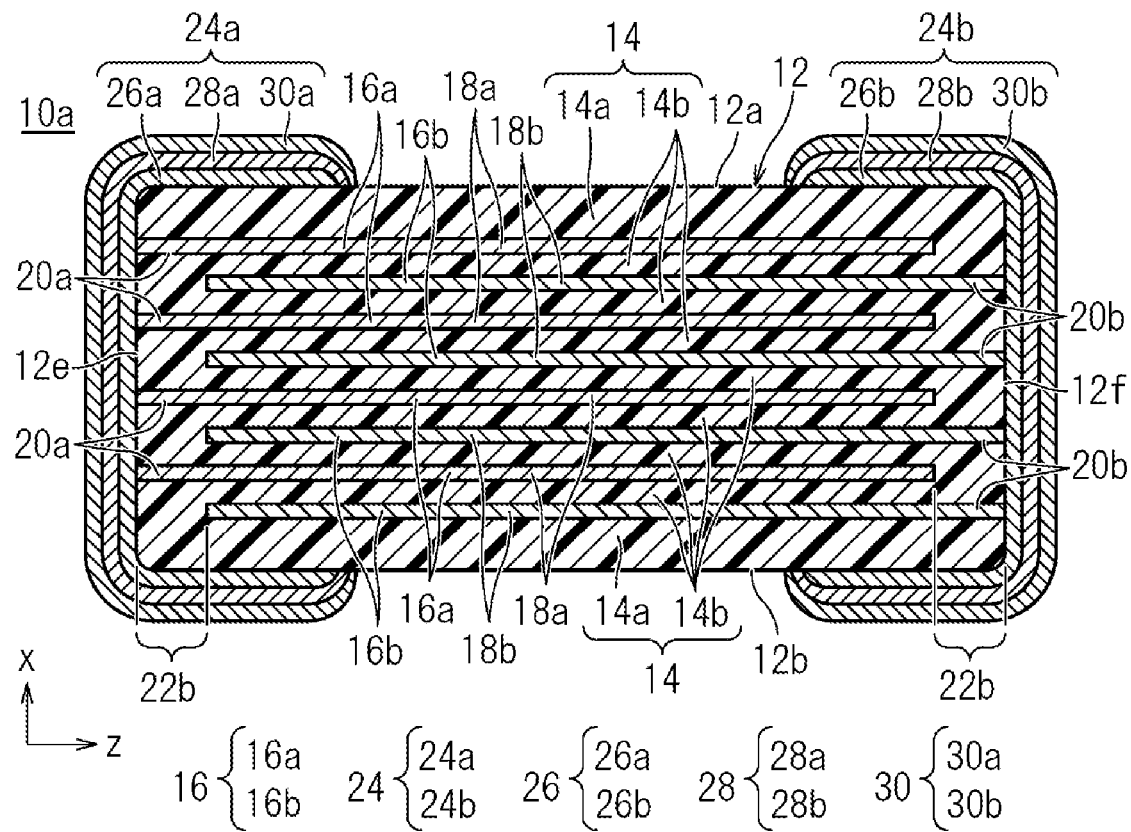
FIG. 5A is a cross-sectional view of a multilayer ceramic capacitor according to a modification example of the present invention.

Next, a multilayer ceramic capacitor according to a modified example of a preferred embodiment of the present invention will be described. FIG. 5A is a cross-sectional view of a multilayer ceramic capacitor according to a modified example of a preferred embodiment of the present invention, and FIG. 5B is an enlarged cross-sectional view illustrating a gap generated between a conductive resin layer and a plating layer of an external electrode in the multilayer ceramic capacitor illustrated in FIG. 5A.

As shown in FIG. 5A, a multilayer ceramic capacitor 10a according to the modified example is the same as the multilayer ceramic capacitor 10 in the structure of the laminated body 12 of the multilayer ceramic capacitor 10 shown in FIG. 1. In addition, an external electrode 24 of the multilayer ceramic capacitor 10a includes a first external electrode 24a and a second external electrode 24b. Further, the external electrode 24 preferably includes a base electrode layer 26 containing a conductive metal and a glass component, a conductive resin layer 28 containing a thermosetting resin and a metal component, disposed so as to cover the base electrode layer 26, and a plating layer 30 covering the conductive resin layer 28. The base electrode layer 26 includes a first base electrode layer 26a and a second base electrode layer 26b. The conductive resin layer 28 includes a first conductive resin layer 28a and a second conductive resin layer 28b. The plating layer 30 includes a first plating layer 30a and a second plating layer 30b.

Figure 5B:
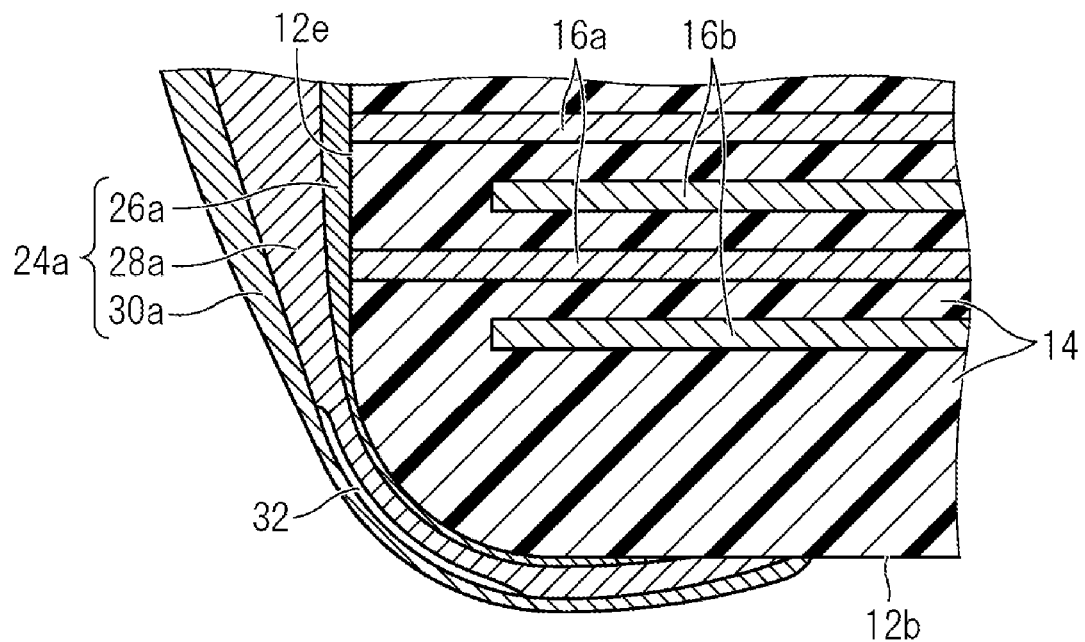
FIG. 5B is an enlarged cross-sectional view illustrating a gap generated between a conductive resin layer and a plating layer of an external electrode in the multilayer ceramic capacitor illustrated in FIG. 5A.

In the multilayer ceramic capacitor 10a according to the modified example, as shown in FIG. 5B, when the multilayer ceramic capacitor 10a is mounted on a mounting board and when stress from the mounting board is applied to the multilayer ceramic capacitor 10a, a gap 32 is generated between the first conductive resin layer 28a and the first plating layer 30a at the ridge line of the first external electrode 24a. In addition, similarly, a gap is provided between the second conductive resin layer 28b and the second plating layer 30b at the ridge line of the second external electrode 24b.

The gap 32 is preferably provided so as to remain in the regions of the ridge lines of the first external electrode 24a and second external electrode 24b.

In the multilayer ceramic capacitor 10a shown in FIG. 5A, the gaps 32 are preferably generated only in the regions of the ridge lines of the external electrodes 24, and thus, while relaxing flexural stress of the mounting board at the ridge line by a fracture crack of the ridge line of the multilayer ceramic capacitor 10a, the fixing strength between the external electrode 24 and the laminated body 12 is able to be maintained without generating any fracture cracks at the portion other than the ridge line. As a result, even in the case of mounting the multilayer ceramic capacitor on a mounting board, the fixing strength with respect to the mounting board is able to be maintained. This makes it possible to prevent the problem of causing the multilayer ceramic capacitor to fall off the mounting board with repeated forces due to a drop impact or vibration, or vibrations, centrifugal forces, or other forces imparted by environments used in the market.

Next, a non-limiting example of a method for manufacturing the multilayer ceramic capacitor according to a preferred embodiment of the present invention will be described.

First, a ceramic paste including a ceramic powder is applied in the form of a sheet, for example, by a screen printing method, and dried, thus preparing ceramic green sheets.

Next, a conductive paste used in internal electrode formation is applied in a predetermined pattern onto the ceramic green sheets by, for example, a screen printing method or other suitable method to prepare the ceramic green sheets on which the conductive pattern for internal electrode formation is formed and the ceramic green sheets on which no conductive pattern for internal electrode formation is formed. The ceramic paste and the conductive paste for internal electrode formation may include, for example, known binders and solvents.

Subsequently, a predetermined number of ceramic green sheets of an outer layer on which no conductive pattern for internal electrode formation is formed is stacked, the ceramic green sheets on which the conductive pattern for internal electrode formation is formed are sequentially stacked thereon, and a predetermined number of ceramic green sheets on which no conductive pattern for internal electrode formation is formed is stacked, thus preparing a mother laminated body. In this regard, the multiple ceramic green sheets on which the conductive pattern for internal electrode formation is applied by printing are stacked so as to alternate extended parts of the conductive patterns for internal electrode formation. If necessary, the mother laminated body may be subjected to pressure bonding in the laminating direction by means such as isostatic press.

Thereafter, the mother laminated body is cut into a predetermined shape and dimensions, thus cutting out a raw laminated body chip. In this regard, the raw laminated body chip is subjected to barrel polishing or the like, thus rounding corners and ridge lines of the laminated body, and then controlling the corners and the ridge lines so as to meet the amount of R specified for the multilayer ceramic capacitor 10 according to the present invention. The amount of R corresponding to a curvature radius along a boundary between the base electrode layer and the conductive resin layer at a ridge line where two surfaces intersect, said two surfaces are two of the first principal surface or the second principal surface, and the first end surface or the second end surface at a boundary portion between the base electrode layer and the conductive resin layer. The conditions for the barrel in this case are as follows: putting the raw laminated body chip and water in a pod, and carrying out polishing at a rotation speed of 150 rpm or more for a barrel time period of 30 minutes or longer.

Subsequently, the raw laminated body chip cut out is subjected to firing, thus producing a laminated body in which the first internal electrode layers and the second internal electrode layers are disposed within the laminated body, and the first internal electrode layers are extended to the first end surface, whereas the second internal electrode layers are extended to the second end surface. The firing temperature for the raw laminated body chip depends on the material of the ceramic and the material of the conductive paste for internal electrode formation, but is preferably about 900° C. or higher and about 1300° C. or lower, for example.

Next, the base electrode layer 26 is formed. First, a conductive paste that forms external electrodes is applied to both of the end surfaces of the fired laminated body chip, and subjected to baking, thus forming the first base electrode layer 26a of the first external electrode 24a and the second base electrode layer 26b for the second external electrode 24b. The baking temperature is preferably about 700° C. or higher and about 900° C. or lower, for example.

Further, after the formation of the base electrode layer 26, the laminated body chip, a medium, and a buffer material are further put in the pod, and polishing is performed at a rotation speed of about 250 rpm or more for a barrel time period of about 100 minutes or longer, thus controlling the thickness of the conductive resin layer 28 at the boundary between the base electrode layer 26 and the conductive resin layer 28 according to the present invention, that is, the thickness of the conductive resin layer 28 the boundary between the base electrode layer 26 and the conductive resin layer 28 to preferably be about 296.6 μm or more, for example.

Subsequently, a conductive resin paste including a thermosetting resin and a metal component is applied so as to cover the base electrode layer 26, and subjected to a heat treatment preferably at a temperature of about 250° C. or higher and about 550° C. or lower, for example, thus providing the resin thermally cured, and then forming the conductive resin layer 28. The atmosphere during the heat treatment in this case is preferably an $N_2$ atmosphere, for example. In addition, in order to prevent the resin from scattering and prevent various metal components from being oxidized, it is preferable to reduce the oxygen concentration to about 100 ppm or less, for example. In addition, in the preparation of the conductive resin paste, the metal component included in the conductive resin paste is preferably adapted to have a flattened powder ratio of about 80% by weight or higher when the metal component is regarded as 100%, for example, the flattened powder included as the metal component of the conductive resin paste preferably has a long side length of about 10.3 µm or more in terms of flat powder D90 value, and the solid content concentration of PVC in the conductive resin paste is preferably adjusted to be about 45 vol % or higher and about 60 vol % or lower, for example. In addition, the flattened powder included as the metal component of the conductive resin paste preferably has a long side length of about 25.1 µm or less in terms of flat powder D90 value, for example.

In the formation of the conductive resin layer 28, the application of the conductive resin paste with a viscosity adjusted to about 30 Pa·s or higher controls the thickness of the conductive resin layer 28 located at the ridge line of the laminated body 12 to be about 11.7 µm or more and about 25 µm or less, for example, based on the correlation between the film thickness of the conductive resin layer 28 on the end surface, determined by the size of the laminated body chip and the conductive resin layer 28 at the ridge line.

Thereafter, the plating layer 30 is formed on the surface of the conductive resin layer 28, thus forming the external electrode 24. For the multilayer ceramic capacitor 10 shown in FIG. 1, a Ni plating layer and a Sn plating layer are formed as the plating layer 30 formed on the conductive resin layer 28. The Ni plating layer and the Sn plating layer are sequentially formed by electrolytic plating, electroless plating, or other suitable method, for example.

As described above, the multilayer ceramic capacitor 10 shown in FIG. 1 is manufactured.

Figure 6A:
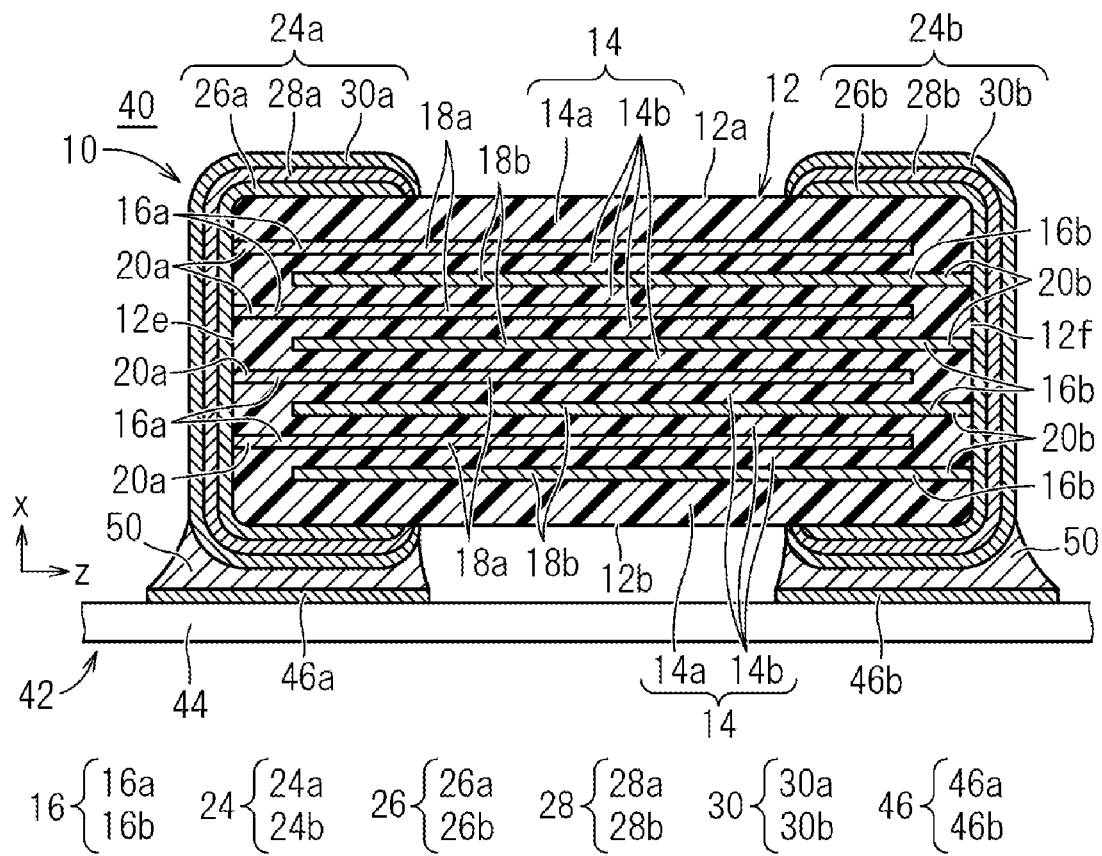
FIG. 6A is a cross-sectional view illustrating an example of a mounted structure of a multilayer ceramic capacitor according to a preferred embodiment of the present invention.
Figure 6B:
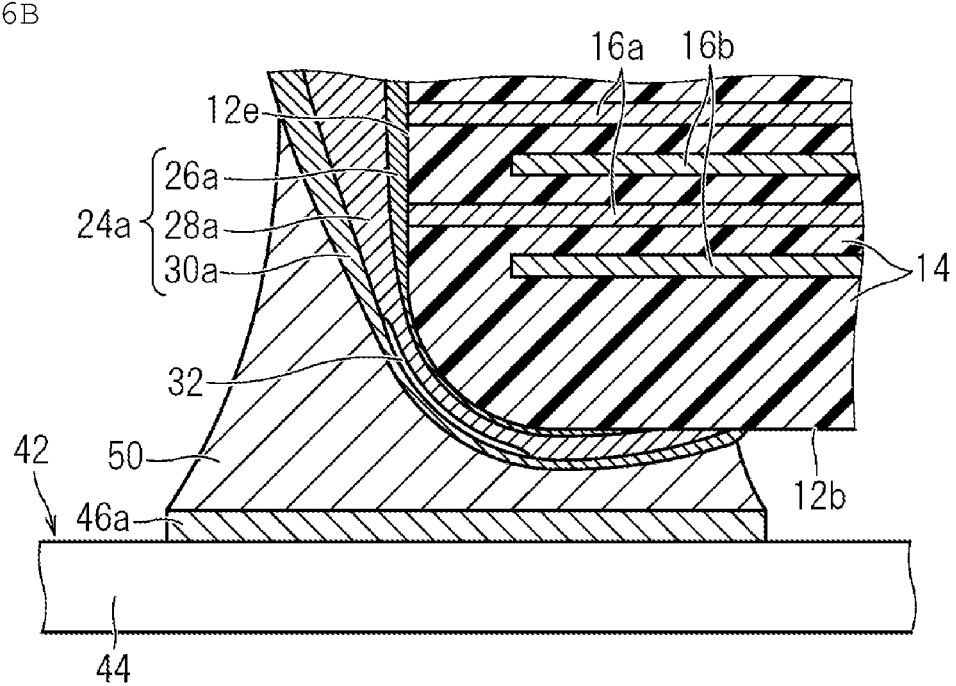
FIG. 6B is an enlarged cross-sectional view illustrating a gap generated between a conductive resin layer and a plating layer of an external electrode in the mounted structure illustrated in FIG. 6A.

Next, the mounted structure of the multilayer ceramic capacitor according to a preferred embodiment of the present invention will be described with reference to FIGS. 6A and 6B. A case of mounting the multilayer ceramic capacitor 10 shown in FIG. 1 onto a substrate 42 will be described as an example. FIG. 6A is a cross-sectional view illustrating an example of the mounted structure of the multilayer ceramic capacitor according to a preferred embodiment of the present invention, and FIG. 6B is an enlarged cross-sectional view illustrating a gap generated between a conductive resin layer and a plating layer of an external electrode in the mounted structure illustrated in FIG. 6A. The multilayer ceramic capacitor 10 shown in FIG. 6A preferably has the same or substantially the same structure as the multilayer ceramic capacitor 10 shown in FIGS. 1 to 3 and FIGS. 4A to 4C.

The mounted structure 40 of the multilayer ceramic capacitor according to the present invention includes the multilayer ceramic capacitor 10 according to a preferred embodiment of the present invention and the substrate 42 to receive the multilayer ceramic capacitor 10.

The substrate 42 is a substrate including a signal electrode 46 (land) attached on a principal surface of a core material 44 of the substrate 42. In addition, the core material 44 may be a single layer, or may be formed from multiple layers. In the case of formation from multiple layers, the signal electrode 46 may be formed on the surface of each core material 44, and electrically connected to signal electrodes (not shown) of the other different layers through via wirings (not shown) or the like, thus forming a wiring.

The core material 44 is preferably made of, for example, a glass epoxy substrate made of a material obtained by impregnating, with an epoxy resin, a base material of a glass fabric (cloth) and a glass nonwoven fabric mixed. The core material 44 is preferably about 200 µm or more and about 1600 µm or less in thickness, for example.

The signal electrode 46 is attached to one or both sides of the core material 44 made of a glass epoxy substrate. The signal electrode 46 includes a first signal electrode 46a and a second signal electrode 46b. The signal electrode 46 is preferably formed from, for example, a metal such as Cu, Ag, Pd, and Pt, or an alloy thereof. Cu is preferred. The signal electrode 46 is preferably about 15 µm or more and about 150 µm or less in thickness, for example.

The multilayer ceramic capacitor 10 is disposed such that the first external electrode 24a is brought into contact with the first signal electrode 46a on the substrate 42, and the second external electrode 24b is brought into contact with the second signal electrode 46b on the substrate 42. Then, the first external electrode 24a and the first signal electrode 46a are joined to be kept electrically connected by a solder 50. Likewise, the second external electrode 24b and the second signal electrode 46b are joined to be kept electrically connected by the solder 50. As the solder 50, for example, an LF solder of Sn-3.0Ag-0.5Cu or the like may preferably be used.

In the mounted structure 40 of the multilayer ceramic capacitor as shown in FIG. 6A, as shown in FIG. 6B, at the ridge line of the first external electrode 24a of the multilayer ceramic capacitor 10, a gap 32 is generated between the first conductive resin layer 28a and the first plating layer 30a. In addition, similarly, a gap is defined between the second conductive resin layer 28b and the second plating layer 30b at the ridge line of the second external electrode 24b.

In the mounted structure 40 of the multilayer ceramic capacitor, shown in FIG. 6A, the presence of the gap 32 at the interface between the conductive resin layer 28 and the plating layer 30 at the ridge line of the multilayer ceramic capacitor 10 can relax flexural stress of the substrate 42, and maintain the fixing strength between the external electrode 24 and the laminated body 12 at the parts other than the ridge line while keeping the laminated body 12 from being cracked. As a result, even in the case of mounting the multilayer ceramic capacitor on the substrate 42, the fixing strength with respect to the substrate can be maintained, thus making it possible to prevent the problem of causing the multilayer ceramic capacitor 10 to fall off the substrate 42 with a drop impact or a repeated force due to vibration.

It is to be noted that a mounted structure with the multilayer ceramic capacitor 10a mounted on a substrate also achieves a similar advantageous effect as the mounted structure 40 of the multilayer ceramic capacitor described above. In this regard, a gap 32 is provided between the first conductive resin layer 28a and the first plating layer 30a at the ridge line of the first external electrode 24a of the multilayer ceramic capacitor 10. In addition, similarly, a gap is provided between the second conductive resin layer 28b and the second plating layer 30b at the ridge line of the second external electrode 24b.

The gap 32 is preferably provided so as to remain in the regions of the ridge lines of the first external electrode 24a and second external electrode 24b.

Next, in order to confirm the advantageous effect of the multilayer ceramic capacitor according to preferred embodiments of the present invention described above, multilayer ceramic capacitors were manufactured, based on the manufacturing method according to a preferred embodiment of the present invention, and subjected to a substrate bending resistance test, thus confirming how peeling was caused at the ridge line of the laminated body and confirming whether any flexural crack was generated.

According to Examples 1 to 18, multilayer ceramic capacitors in accordance with the specifications described later were prepared in accordance with the previously described method for manufacturing a multilayer ceramic electronic component.

According to Examples 1 to 18, after the base electrode layer was formed on the laminated body, barrel polishing was performed such that the amount of R at the boundary between the base electrode layer and the conductive resin layer was about 296.6 μm or more, and in the preparation of the conductive resin paste used for the formation of the conductive resin layer, the metal component included in the conductive resin paste was adapted to have a flattened powder ratio of about 80% by weight or higher when the metal component was regarded as 100%, the flattened powder included as the metal component of the conductive resin paste was adapted to have a long side length of about 10.3 μm or more and about 34 μm or less in terms of flat powder D90 value, and the solid content concentration of PVC in the conductive resin paste was adjusted within the range of about 45 vol % or higher and about 60 vol % or lower. In addition, the thickness of the conductive resin layer located at the ridge line of the laminated body was controlled to be about 11.7 μm or more and about 25 μm or less.

On the other hand, according to Comparative Examples 1 to 13, multilayer ceramic capacitors in accordance with the specifications described later were prepared in accordance with a conventional method for manufacturing a multilayer ceramic electronic component.

In this regard, Comparative Examples 1 to 3 correspond to samples obtained by, after the base electrode layer was formed on the laminated body, performing barrel polishing such that the amount of R at the boundary between the base electrode layer and the conductive resin layer was smaller than about 296.6 μm, and controlling the conductive resin layer for the laminated body such that the thickness of the conductive resin layer located at the ridge line of the laminated body was smaller than about 11.7 μm.

Comparative Example 4 corresponds to a sample obtained by controlling the conductive resin layer for the laminated body such that the thickness of the conductive resin layer located at the ridge line of the laminated body was smaller than about 11.7 μm.

Comparative Examples 5 to 7 correspond to samples obtained by adjusting the solid content concentration of PVC in the conductive resin paste to about 35 vol %.

In addition, Comparative Examples 5 and 8 to 10 correspond to samples obtained by adapting the metal component included in the conductive resin paste to have a flattened powder ratio of about 60% by weight when the metal component is regarded as 100%.

Comparative Examples 12 and 13 correspond to samples obtained by controlling the conductive resin layer for the laminated body such that the thickness of the conductive resin layer located at the ridge line of the laminated body was smaller than about 11.7 μm, and adapting the flattened powder included as the metal component of the conductive resin paste to have a long side length smaller than about 10.3 μm in terms of flattened powder D90 value.

Further, Comparative Example 11 corresponds to a sample where the solid content concentration of PVC in the conductive resin paste is about 65 vol %, but the others are not evaluable.

Here are the specifications of the multilayer ceramic capacitors as the samples used in the experimental example.

Size of Multilayer Ceramic Capacitor (Design Value):
Length×Width×Height=about 3.2 mm×about 1.6 mm×about 1.6 mm
Capacitance: about 0.01 μF
Rated Voltage: about 630 V
Material of Dielectric Layer: $BaTiO_3$
Structure of External Electrode:
Material for Base Electrode Layer: Electrode including Conductive Metal (Cu) and Glass
Film Thickness of Base Electrode Layer on End Surface: about 80 μm
Conductive Resin Layer: Metallic Filler: Ag
Flattened Powder Ratio in Metal Filler: See Tables 1 to 3
Diameter of Flattened Powder in Metal Filler: See Tables 1 to 3
Resin: Epoxy Type
Thermal Curing Temperature: about 200° C.
Thickness of Conductive Resin Layer: Control of Film Thickness under Dip Condition to reach Thickness of Ridge Line listed in Tables 1 to 3
R amount at Ridge Line of Conductive Resin Layer: See Tables 1 to 3
PVC amount in Conductive Resin Layer: See Tables 1 to 3
Thickness of Conductive Resin Layer at Ridge Line: See Tables 1 to 3
Plating Layer: Two-layer Structure of Ni Plating Layer and Sn Plating Layer
Ni plating Layer: Thickness in Central portion in Height Direction, located at First End Surface and Second End Surface in Cross Section of Laminated Body at Position of ½W: about 3.2 μm
Thickness in Central portion in Length Direction, located over First Principal Surface and Second Principal Surface and First Side Surface and Second Side Surface in Cross Section of Laminated Body at Position of ½W: about 4.8 μm
Sn Plating Layer: Thickness in Central portion in Height Direction, located at First End Surface and Second End Surface in Cross Section of Laminated Body at Position of ½W: about 3.5 μm
Thickness in Central portion in Length Direction, located over First Principal Surface and Second Principal Surface and First Side Surface and Second Side Surface in Cross Section of Laminated Body at Position of ½W: about 6.1 μm (a) Substrate Bending Resistance Test The sample of the multilayer ceramic capacitor was mounted onto a JIS substrate (glass epoxy substrate) of about 1.6 mm in thickness with the use of a solder paste. Pressing with a metallic pushing rod with a tip of about 5 mm±0.1 mm in roundness from the unmounted substrate surface bent the substrate to apply mechanical stress to the substrate. In this case, the holding time was set to about 5 seconds, and the flexure amount was set to about 5 mm.

(b) Method for Check of Peeling at Ridge Line and Method for Check of Cracks

After performing the substrate bending resistance test mentioned above, the sample of the multilayer ceramic capacitor were removed from the test substrate with the use of a hot plate, and was filled with a resin, with the sample tilted at about 90° from the mounted state. Then, polishing was carried out in the length direction z until reaching the position of about ½W in the width direction y of the multilayer ceramic capacitor, thus exposing an LT cross section. Two points at the ridge line in the LT cross section on the side mounted on the test substrate were observed with a microscope at 200-fold magnification or more, thus counting the number of samples generated with a gap generated between the conductive resin layer and the plating layer.

Additionally, the number of samples generated with the laminated body cracked was counted.

The numbers of samples for each example and each comparative example were n=30.

(c) Method for Measuring R amount at Ridge Line

The multilayer ceramic capacitor as a sample was polished in cross-section in the length direction z until reaching the position of about ½W in the width direction y. Thereafter, in the polished cross section, the amount of R at the boundary between the base electrode layer and the conductive resin layer at the ridge line where two surfaces intersect: said two surfaces are the first principal surface or the second principal surface; and the first end surface or the second end surface was measured by image processing. In this case, the numbers of samples for each example and each comparative example were n=10. In addition, for the amount of R, the amounts of R at four ridge lines were measured for each sample, and the amount of R was regarded as the average value for the amounts of R at the four ridge lines.

The amount of R means a curvature radius along the boundary between the base electrode layer and the conductive resin layer at the ridge line where two surfaces intersect, said two surfaces are two of the first principal surface or the second principal surface; and the first end surface or the second end surface.

(d) Method for Measuring Ratio of Flattened Powder

The multilayer ceramic capacitor as a sample was polished in cross-section in the length direction z until reaching the position of about ½W in the width direction y. In the cross section, the conductive resin layer was observed with a SEM, and an image with an area of at least about 2500 $\mu m^2$ was observed. Images of at least n=5 or more cross sections were observed, and the ratio of the flattened powder was calculated from the average for the ratios between the flattened powder and spherical powder in the images.

(e) Method for Measuring Long Side Length in Terms of Flattened Powder D90 Value in Conductive Resin Layer A wire with solder was joined to the external electrode located on the principal surface of the multilayer ceramic capacitor as a sample. Then, the conductive resin layer was fractured by pulling the wire, and the D90 value was determined by observing the long side length of the flattened powder observed at the fracture surface for at least n=300.

(f) Method for Measuring Solid Content Concentration of PVC in Conductive Resin Layer The conductive resin layer was taken out of the multilayer ceramic capacitor as a sample with pliers or the like. The obtained sample of the conductive resin layer was subjected to TG-DTA in an air atmosphere, thus measuring the decrease in weight at room temperature or higher and 900° C. or lower. Since the decrease in weight corresponds to the organic component in the conductive resin layer, the volume ratio was calculated from the specific gravity of the metal component and the specific gravity of the organic component (for convenience, 1), thus figuring out the PVC.

(g) Method for Measuring Thickness of Conductive Resin Layer Located at Ridge Line The multilayer ceramic capacitor as a sample was polished in cross-section in the length direction z until reaching the position of about ½W in the width direction y. Thereafter, in the polished cross section, the thickness of the conductive resin layer at the ridge line where two surfaces: the first principal surface or the second principal surface; and the first end surface or the second end surface intersected was measured by image processing. In this case, the numbers of samples for each example and each comparative example were n=10. In addition, as for the thickness of the conductive resin layer at the ridge line, the thicknesses of the conductive resin layer at four ridge lines were measured for each sample, and the thickness of the conductive resin layer was regarded as the average value for the thicknesses of the conductive resin layer at the four ridge lines.

The samples for each example and each comparative example were subjected to a substrate bending resistance test, and Tables 1 to 3 show therein the respective experimental results of confirming how peeling was caused at the ridge line of the laminated body and confirming whether any flexural crack was generated. Table 1 shows the results in the case of changing the amount of R at the boundary between the base electrode layer and the conductive resin layer, and in the case of changing the thickness of the conductive resin layer located at the ridge line of the laminated body. Table 2 shows the results in the case of changing the solid content concentration of PVC in the conductive resin paste, and in the case of changing the ratio of the flattened powder, with the metal component regarded as 100%. Table 3 shows the results in the case of changing the thickness of the conductive resin layer located at the ridge line of the laminated body, and in the case of changing the long side length in terms of flattened powder D90 value.

TABLE 1

|  | Comparative Example 1 | Comparative Example 2 | Comparative Example 3 | Comparative Example 4 | Example 1 | Example 2 |
|---|---|---|---|---|---|---|
| R Amount at Boundary between Base Electrode Layer and Conductive Resin Layer ($\mu m$) |  | 254.6 |  |  | 296.6 |  |
| Thickness of Conductive Resin Layer located at Ridge Line of Laminated Body ($\mu m$) | 7.3 | 8.1 | 11.4 | 10.9 | 11.7 | 13.7 |
| Solid Content Concentration of PVC in Conductive Resin Paste (vol %) | 55 | 55 | 55 | 55 | 55 | 55 |
| Ratio of Flattened Powder in Metal Component (%) | 100 | 100 | 100 | 100 | 100 | 100 |
| Long Side Length in terms of Flattened Powder D90 Value ($\mu m$) | 10.3 | 10.3 | 10.3 | 10.3 | 10.3 | 10.3 |
| The Number of Samples Generated with Gap Produced (—) | 0/30 | 0/30 | 1/30 | 22/30 | 30/30 | 30/30 |
| The Number of Flexural Cracks Generated (—) | 4/30 | 1/30 | 3/30 | 0/30 | 0/30 | 0/30 |

|  | Example 3 | Example 4 | Example 5 | Example 6 | Example 7 | Example 8 |
|---|---|---|---|---|---|---|
| R Amount at Boundary between Base Electrode Layer and Conductive Resin Layer ($\mu m$) |  | 323.3 |  |  | 341.6 |  |
| Thickness of Conductive Resin Layer located at Ridge Line of Laminated Body ($\mu m$) | 11.9 | 13.3 | 13.8 | 13.0 | 14.9 | 15.4 |

TABLE 1-continued

|  |  |  |  |  |  |  |
|---|---|---|---|---|---|---|
| Solid Content Concentration of PVC in Conductive Resin Paste (vol %) | 55 | 55 | 55 | 55 | 55 | 55 |
| Ratio of Flattened Powder in Metal Component (%) | 100 | 100 | 100 | 100 | 100 | 100 |
| Long Side Length in terms of Flattened Powder D90 Value (μm) | 10.3 | 10.3 | 10.3 | 10.3 | 10.3 | 10.3 |
| The Number of Samples Generated with Gap Produced (—) | 30/30 | 30/30 | 30/30 | 30/30 | 30/30 | 30/30 |
| The Number of Flexural Cracks Generated (—) | 0/30 | 0/30 | 0/30 | 0/30 | 0/30 | 0/30 |

Column from top to bottom
1 R Amount at Boundary between Base Electrode Layer and Conductive Resin Layer (μm)
2 Thickness of Conductive Resin Layer located at Ridge Line of Laminated Body (μm)
3 Solid Content Concentration of PVC in Conductive Resin Paste (vol %)
4 Ratio of Flattened Powder in Metal Component (%)
5 Long Side Length in terms of Flattened Powder D90 Value (μm)
6 The Number of Samples Generated with Gap Produced
7 The Number of Flexural Cracks Generated (—)

TABLE 2

|  | Comparative Example 5 | Comparative Example 6 | Comparative Example 7 | Comparative Example 8 | Example 9 | Example 10 | Comparative Example 9 |
|---|---|---|---|---|---|---|---|
| R Amount at Boundary between Base Electrode Layer and Conductive Resin Layer (μm) |  |  |  | 323.3 |  |  |  |
| Thickness of Conductive Resin Layer located at Ridge Line of Laminated Body (μm) | 13.5 | 13.7 | 11.7 | 12.9 | 12.6 | 12.2 | 12.0 |
| Solid Content Concentration of PVC in Conductive Resin Paste (vol %) | 35 | 35 | 35 | 45 | 45 | 45 | 55 |
| Ratio of Flattened Powder in Metal Component (%) | 60 | 80 | 100 | 60 | 80 | 100 | 60 |
| Long Side Length in terms of Flattened Powder D90 Value (μm) | 10.3 | 10.3 | 10.3 | 10.3 | 10.3 | 10.3 | 10.3 |
| The Number of Samples Generated with Gap Produced (—) | 1/30 | 4/30 | 3/30 | 11/30 | 30/30 | 30/30 | 19/30 |
| The Number of Flexural Cracks Generated (—) | 3/30 | 0/30 | 3/30 | 1/30 | 0/30 | 0/30 | 0/30 |

|  | Example 11 | Example 12 | Comparative Example 10 | Example 13 | Example 14 | Comparative Example 11 |
|---|---|---|---|---|---|---|
| R Amount at Boundary between Base Electrode Layer and Conductive Resin Layer (μm) |  |  | 323.3 |  |  |  |
| Thickness of Conductive Resin Layer located at Ridge Line of Laminated Body (μm) | 13.1 | 13.3 | 13.2 | 12.4 | 13.0 | Not evaluable |
| Solid Content Concentration of PVC in Conductive Resin Paste (vol %) | 55 | 55 | 80 | 60 | 60 | Not evaluable |
| Ratio of Flattened Powder in Metal Component (%) | 80 | 100 | 60 | 80 | 100 | Not evaluable |
| Long Side Length in terms of Flattened Powder D90 Value (μm) | 10.3 | 10.3 | 10.3 | 10.3 | 10.3 | Not evaluable |
| The Number of Samples Generated with Gap Produced (—) | 30/30 | 30/30 | 22/30 | 30/30 | 30/30 | Not evaluable |
| The Number of Flexural Cracks Generated (—) | 0/30 | 0/30 | 0/30 | 0/30 | 0/30 | Not evaluable |

Column from top to bottom
1 R Amount at Boundary between Base Electrode Layer and Conductive Resin Layer (μm)
2 Thickness of Conductive Resin Layer located at Ridge Line of Laminated Body (μm)
3 Solid Content Concentration of PVC in Conductive Resin Paste (vol %)
4 Ratio of Flattened Powder in Metal Component (%)
5 Long Side Length in terms of Flattened Powder D90 Value (μm)
6 The Number of Samples Generated with Gap Produced (—)
7 The Number of Flexural Cracks Generated (—)

TABLE 3

|  | Comparative Example 12 | Comparative Example 13 | Example 15 | Example 16 | Example 17 | Example 18 |
|---|---|---|---|---|---|---|
| R Amount at Boundary between Base Electrode Layer and Conductive Resin Layer (μm) |  |  | 323.3 |  |  |  |
| Thickness of Conductive Resin Layer located at Ridge Line of Laminated Body (μm) | 10.9 | 10.1 | 13.3 | 13.2 | 13.7 | 14.0 |
| Solid Content Concentration of PVC in Conductive Resin Paste (vol %) | 55 | 55 | 55 | 55 | 55 | 55 |
| Ratio of Flattened Powder in Metal Component (%) | 100 | 100 | 100 | 100 | 100 | 100 |

TABLE 3-continued

| | Comparative Example 12 | Comparative Example 13 | Example 15 | Example 16 | Example 17 | Example 18 |
|---|---|---|---|---|---|---|
| Long Side Length in terms of Flattened Powder D90 Value (μm) | 7.2 | 9.5 | 10.3 | 18.9 | 25.1 | 34.0 |
| The Number of Samples Generated with Gap Produced (—) | 11/30 | 20/30 | 30/30 | 30/30 | 30/30 | 29/30 |
| The Number of Flexural Cracks Generated (—) | 11/30 | 1/30 | 0/30 | 0/30 | 0/30 | 0/30 |

Column from top to bottom
1 R Amount at Boundary between Base Electrode Layer and Conductive Resin Layer (μm)
2 Thickness of Conductive Resin Layer located at Ridge Line of Laminated Body (μm)
3 Solid Content Concentration of PVC in Conductive Resin Paste (vol %)
4 Ratio of Flattened Powder in Metal Component (%)
5 Long Side Length in terms of Flattened Powder D90 Value (μm)
6 The Number of Samples Generated with Gap Produced (—)
7 The Number of Flexural Cracks Generated (—)

As shown in Table 1, the conditions of the samples used in the experiments according to Examples 1 to 8 are as follows: the amount of R at the boundary between the base electrode layer and the conductive resin layer is about 296.6 μm or more; the metal component included in the conductive resin paste has a flattened powder ratio of about 80% by weight or higher when the metal component is regarded as 100%; the flattened powder included as the metal component of the conductive resin paste has a long side length of about 10.3 μm or more and about 25.1 μm or less in terms of flattened powder D90 value; the solid content concentration of PVC in the conductive resin paste falls within the range of about 45 vol % or higher and about 60 vol % or lower; and the conductive resin layer located at the ridge line of the laminated body has a thickness of about 11.7 μm or more and about 25 μm or less. Thus, the samples according to Examples 1 to 8 all had, as a result of confirming whether peeling was caused at the ridge line after the substrate bending resistance test, peeling (gaps) generated, without any flexural crack generated.

On the other hand, according to each of Comparative Examples 1 to 3, the amount of R at the boundary between the base electrode layer and the conductive resin layer is about 254.3 μm, which is smaller than about 296.6 μm, and the thickness of the conductive resin layer located at the ridge line of the laminated body is smaller than about 11.7 μm. Therefore, samples according to Comparative Example 1 had, as a result of confirming whether peeling was caused at the ridge line after the substrate bending resistance test, no peeling (gaps) generated, with the result that four samples had flexural cracks generated among the thirty samples, samples according to Comparative Example 2 had, as a result of confirming whether peeling was caused at the ridge line after the substrate bending resistance test, no peeling (gaps) generated, with the result that one sample had a flexural crack generated among the thirty samples, and one of thirty samples according to Comparative Example 3 had, as a result of confirming whether peeling was caused at the ridge line after the substrate bending resistance test, peeling (gap) generated, with the result that three samples had flexural cracks generated among the thirty samples.

In addition, according to Comparative Example 4, the thickness of the conductive resin layer located at the ridge line of the laminated body is smaller than about 11.7 μm. Therefore, twenty two of thirty samples according to Comparative Example 4 had, as a result of confirming whether peeling was caused at the ridge line after the substrate bending resistance test, peeling (gaps) generated, without any flexural crack generated.

Next, as shown in Table 2, the conditions of the samples used in the experiments according to Examples 9 to 14 are as follows: the amount of R at the boundary between the base electrode layer and the conductive resin layer is 296.6 μm or more; the metal component included in the conductive resin paste has a flattened powder ratio of about 80% by weight or higher when the metal component is regarded as 100%; the flattened powder included as the metal component of the conductive resin paste has a long side length of about 10.3 μm or more and about 25.1 μm or less in terms of flattened powder D90 value; the solid content concentration of PVC in the conductive resin paste falls within the range of about 45 vol % or higher and about 60 vol % or lower; and the conductive resin layer located at the ridge line of the laminated body has a thickness of 11.7 μm or more and 25 μm or less. Thus, the samples according to Examples 9 to 14 all had, as a result of confirming whether peeling was caused at the ridge line after the substrate bending resistance test, peeling (gaps) generated, without any flexural crack generated.

On the other hand, according to each of Comparative Examples 5 to 7, the solid content concentration of PVC in the conductive resin paste is about 35 vol %, which falls outside the range of about 45 vol % or higher and about 60 vol % or lower. Furthermore, according to Comparative Example 5, the metal component included in the conductive resin paste is about 60% by weight, and when the metal component is regarded as 100%, the ratio of the flattened powder is lower than about 80% by weight. Therefore, one of thirty samples according to Comparative Example 5 had, as a result of confirming whether peeling was caused at the ridge line after the substrate bending resistance test, peeling (gap) generated, with the result that three samples had flexural cracks generated among the thirty samples, four of thirty samples according to Comparative Example 6 had, as a result of confirming whether peeling was caused at the ridge line after the substrate bending resistance test, peeling (gaps) generated, without any flexural crack generated, and three of thirty samples according to Comparative Example 7 had, as a result of confirming whether peeling was caused at the ridge line after the substrate bending resistance test, peeling (gaps) generated, with the result that three samples had flexural cracks generated among the thirty samples.

In addition, according to each of Comparative Examples 8 to 10, the metal component included in the conductive resin paste is about 60% by weight, and when the metal component is regarded as 100%, the ratio of the flattened powder is lower than 80% by weight. Therefore, eleven of thirty samples according to Comparative Example 8 had, as a result of confirming whether peeling was caused at the ridge line after the substrate bending resistance test, peeling (gaps) generated, with the result that one sample had a flexural crack generated among the thirty samples, nineteen of thirty samples according to Comparative Example 9 had, as a result of confirming whether peeling was caused at the ridge line after the substrate bending resistance test, peeling (gaps) generated, without any flexural crack generated, and twenty two of thirty samples according to Comparative Example 10 had, as a result of confirming whether peeling was caused at the ridge line after the substrate bending resistance test, peeling (gaps) generated, without any flexural crack generated.

Further, according to Comparative Example 11, the solid content concentration of PVC in the conductive resin paste is about 65 vol %, which falls outside the range of about 45 vol % or higher and about 60 vol % or lower. In this case, the conductive resin paste failed to turn into a fluid paste, thus failing to form the conductive resin layer, and it was not possible to make any evaluation.

In addition, as shown in Table 3, the conditions of the samples used in the experiments according to Examples 15 to 17 are as follows: the amount of R at the boundary between the base electrode layer and the conductive resin layer is about 296.6 μm or more; the metal component included in the conductive resin paste has a flattened powder ratio of about 80% by weight or higher when the metal component is regarded as 100%; the flattened powder included as the metal component of the conductive resin paste has a long side length of about 10.3 μm or more and about 25.1 μm or less in terms of flattened powder D90 value; the solid content concentration of PVC in the conductive resin paste falls within the range of about 45 vol % or higher and about 60 vol % or lower; and the conductive resin layer located at the ridge line of the laminated body has a thickness of about 11.7 μm or more and about 25 μm or less. Thus, the samples according to Examples 15 to 17 all had, as a result of confirming whether peeling was caused at the ridge line after the substrate bending resistance test, peeling (gaps) generated, without any flexural crack generated.

Further, the conditions of the samples used in the experiments according to Example 18 are as follows: the amount of R at the boundary between the base electrode layer and the conductive resin layer is about 296.6 μm or more; the metal component included in the conductive resin paste has a flattened powder ratio of about 80% by weight or higher when the metal component is regarded as 100%; the solid content concentration of PVC in the conductive resin paste falls within the range of about 45 vol % or higher and about 60 vol % or lower; and the conductive resin layer located at the ridge line of the laminated body has a thickness of about 11.7 μm or more and about 25 μm or less, but the flattened powder included as the metal component of the conductive resin paste has a long side length of about 34 μm in terms of flattened powder D90 value. Therefore, twenty nine of thirty samples had, as a result of confirming whether peeling was caused at the ridge line after the substrate bending resistance test, peeling (gaps) generally generated, without any flexural crack generated.

On the other hand, according to Comparative Example 12 and 13, the thickness of the conductive resin layer located at the ridge line of the laminated body is smaller than about 11.7 μm, and the flattened powder included as the metal component of the conductive resin paste has a long side length in terms of flattened powder D90 value falls outside the range of about 10.3 μm or more and about 25.1 μm or less. Therefore, eleven of thirty samples according to Comparative Example 12 had, as a result of confirming whether peeling was caused at the ridge line after the substrate bending resistance test, peeling (gap) generated, with the result that eleven samples had flexural cracks generated among the thirty samples, and twenty of thirty samples according to Comparative Example 13 had, as a result of confirming whether peeling was caused at the ridge line after the substrate bending resistance test, peeling (gaps) generated, with the result that one sample has a flexural crack generated among the thirty samples.

From the foregoing results, it has been confirmed that the multilayer ceramic capacitor according to the present invention can provide a multilayer ceramic capacitor capable of also maintaining the fixing strength between the external electrode and the laminated body, while maintaining the effect of preventing the laminated body from being cracked because of the effect of the conductive resin layer, since the amount of R at the boundary between the base electrode layer and the conductive resin layer is about 296.6 μm or more; the metal component included in the conductive resin paste has a flattened powder ratio of about 80% by weight or higher when the metal component is regarded as 100%; the flattened powder included as the metal component of the conductive resin paste has a long side length of about 10.3 μm or more and about 25.1 μm or less in terms of flattened powder D90 value; the solid content concentration of PVC in the conductive resin paste falls within the range of about 45 vol % or higher and about 60 vol % or lower; and the conductive resin layer located at the ridge line of the laminated body has a thickness of about 11.7 μm or more and about 34 μm or less.

As described above, the preferred embodiment of the present invention are disclosed in the above description, but the present invention is not to be considered limited thereto.

More specifically, various modifications may be made to the above-described preferred embodiments with respect to mechanism, shape, material, quantity, position, arrangement, etc. without departing from the technical idea and object scope of the present invention, and are considered to be included in the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a laminated body including plurality of dielectric layers laminated and a plurality of internal electrode layers that are laminated, and including a first principal surface and a second principal surface opposed to each other in a laminating direction, a first side surface and a second side surface opposed to each other in a width direction perpendicular or substantially perpendicular to the laminating direction, and a first end surface and a second end surface opposed to each other in a length direction perpendicular or substantially perpendicular to the laminating direction and to the width direction; and a pair of external electrodes connected to at least some of the plurality of internal electrode layers, and disposed on the first end surface and the second end surface, partially on the first principal surface and the second principal surface, and partially on the first side surface and the second side surface; wherein
   the external electrode includes a base electrode layer including a conductive metal and a glass component, a conductive resin layer including a thermosetting resin and a metal component, the conductive resin layer disposed on the base electrode layer, and a plating layer disposed on the conductive resin layer;

a curvature radius along a boundary between the base electrode layer and the conductive resin layer is about 296.6 µm or greater at a ridge line at which at least two surfaces intersect, the at least two surfaces including at least the first principal surface or the second principal surface, and the first end surface or the second end surface;

the metal component of the conductive resin layer includes a spherical powder and flattened powder, has a flattened powder ratio of about 80% by weight or higher when the metal component is regarded as 100%, and has a long side length of about 10.3 µm or greater in terms of D90 value of the flattened powder;

a solid content concentration of PVC in the conductive resin layer is about 45 vol % or higher and 60 about vol % or lower; and the conductive resin layer located at the ridge line has a thickness of about 11.7 µm or greater.

2. The multilayer ceramic capacitor according to claim 1, wherein the long side length in terms of flattened powder D90 value is about 25.1 µm or less; and the conductive resin layer located at the ridge line has a thickness of about 25 µm or less.

3. A mounted structure of a multilayer ceramic capacitor, wherein the multilayer ceramic capacitor according to claim 1 is mounted on a substrate;

the substrate includes a signal electrode disposed on a principal surface of the substrate; and the external electrode of the multilayer ceramic capacitor is connected to the signal electrode of the substrate with the first principal surface or the second principal surface of the multilayer ceramic capacitor, or the first side surface or the second side surface of the multilayer ceramic capacitor being opposed to the principal surface of the substrate.

4. The multilayer ceramic capacitor according to claim 1, wherein the dielectric layers have a thickness of about 0.5 µm or more and about 20.0 µm or less.

5. The multilayer ceramic capacitor according to claim 1, wherein the plurality of internal electrode layers are made of Ni, Cu, Ag, Pd, and Au, or an alloy containing at least one of Ni, Cu, Ag, Pd, and Au.

6. The multilayer ceramic capacitor according to claim 1, wherein the plurality of internal electrode layers include floating internal electrode layers which are not connected to the pair of external electrodes.

7. The multilayer ceramic capacitor according to claim 6, wherein the plurality of internal electrode layers define multiple opposed electrode portions which define separate capacitor components.

8. The multilayer ceramic capacitor according to claim 7, wherein the multiple opposed electrode portions are connected in series with one another.

9. The multilayer ceramic capacitor according to claim 1, wherein the conductive metal is made of at least one selected from Cu, Ni, Ag, Pd, an Ag—Pd alloy, and Au.

10. The multilayer ceramic capacitor according to claim 1, wherein the glass component contains at least one selected from B, Si, Ba, Mg, Al, and Li.

11. The multilayer ceramic capacitor according to claim 1, wherein the metal component includes a flattened powder.

12. The multilayer ceramic capacitor according to claim 1, wherein a total thickness of the conductive resin layer located at the ridge line where two surfaces of: the first principal surface or the second principal surface; and the first end surface or the second end surface thereof intersect is about 11.7 µm or more.

13. The multilayer ceramic capacitor according to claim 12, wherein a total thickness of the conductive resin layer located at the ridge line where the surfaces of: the first principal surface or the second principal surface; and the first end surface or the second end surface thereof intersect is about 25 µm or less.

14. The multilayer ceramic capacitor according to claim 1, wherein the plating layer contains at least one selected from Cu, Ni, Sn, Ag, Pd, an Ag—Pd alloy, Au.

15. The multilayer ceramic capacitor according to claim 1, wherein the plating layer is defined by a two-layer structure including a Ni plating layer and a Sn plating layer.

16. The multilayer ceramic capacitor according to claim 1, wherein the gap is provided only in a ridge line region adjacent to the ridge line of the external electrode.

17. A multilayer ceramic capacitor comprising:

a laminated body including a plurality of dielectric layers laminated and a plurality of internal electrode layers that are laminated, and including a first principal surface and a second principal surface opposed to each other in a laminating direction, a first side surface and a second side surface opposed to each other in a width direction perpendicular or substantially perpendicular to the laminating direction, and a first end surface and a second end surface opposed to each other in a length direction perpendicular or substantially perpendicular to the laminating direction and to the width direction; and a pair of external electrodes connected to the internal electrode layer, and disposed on the first end surface and the second end surface, partially on the first principal surface and the second principal surface, and partially on the first side surface and the second side surface; wherein the external electrode includes a base electrode layer including a conductive metal and a glass component, a conductive resin layer including a thermosetting resin and a metal component, the conductive resin layer disposed on the base electrode layer, and a plating layer disposed on the conductive resin layer; and when the multilayer ceramic capacitor is mounted on a substrate and stress from the substrate is applied to the multilayer ceramic capacitor, a gap is provided between the conductive resin layer and the plating layer at a ridge line of the external electrode.

18. The multilayer ceramic capacitor according to claim 17, wherein the gap is also present in a ridge line region adjacent to the ridge line of the external electrode.

19. A mounted structure of a multilayer ceramic capacitor, wherein the multilayer ceramic capacitor is mounted on a substrate, the multilayer ceramic capacitor comprises:

a laminated body including a plurality of dielectric layers that are laminated and a plurality of internal electrode layers that are laminated, and including a first principal surface and a second principal surface opposed to each other in a laminating direction, a first side surface and a second side surface opposed to each other in a width direction perpendicular or substantially perpendicular to the laminating direction, and a first end surface and a second end surface opposed to each other in a length direction perpendicular or substantially perpendicular to the laminating direction and to the width direction; and a pair of external electrodes connected to the internal electrode layer, and disposed on the first end surface and the second end surface, partially on the first principal surface and the second principal surface, and partially on the first side surface and the second side surface;

the substrate includes a signal electrode disposed on a principal surface of the substrate;

the external electrode of the multilayer ceramic capacitor is connected to the signal electrode of the substrate with the first principal surface or the second principal surface of, or the first side surface or the second side surface of the multilayer ceramic capacitor being opposed to the principal surface of the substrate;

the external electrode includes a base electrode layer including a conductive metal and a glass component, a conductive resin layer including a thermosetting resin and a metal component, the conductive resin layer disposed on the base electrode layer, and a plating layer disposed on the conductive resin layer; and a gap is provided between the conductive resin layer and the plating layer at a ridge line of the external electrode.

20. The mounted structure of a multilayer ceramic capacitor according to claim 19, wherein the gap is also present in a ridge line region adjacent to the ridge line of the external electrode.

* * * * *